(12) United States Patent
Shin et al.

(10) Patent No.: US 12,101,550 B2
(45) Date of Patent: Sep. 24, 2024

(54) ELECTRONIC DEVICE AND METHOD FOR CONTROLLING SCREEN THEREOF

(71) Applicant: Samsung Electronics Co., Ltd., Suwon-si (KR)

(72) Inventors: Hyungwoo Shin, Suwon-si (KR); Kwanghyun Jang, Suwon-si (KR); Joonil Park, Suwon-si (KR); Jihee Yoon, Suwon-si (KR); Yujin Lim, Suwon-si (KR); Woojin Jung, Suwon-si (KR); Nari Choi, Suwon-si (KR); Junho Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 160 days.

(21) Appl. No.: 17/860,653

(22) Filed: Jul. 8, 2022

(65) Prior Publication Data
US 2022/0345638 A1    Oct. 27, 2022

Related U.S. Application Data

(63) Continuation of application No. PCT/KR2021/010085, filed on Aug. 2, 2021.

(30) Foreign Application Priority Data

Aug. 4, 2020  (KR) .......................... 10-2020-0097579

(51) Int. Cl.
*H04N 23/63*    (2023.01)
*H04N 5/262*    (2006.01)
(Continued)

(52) U.S. Cl.
CPC ......... *H04N 23/632* (2023.01); *H04N 5/2628* (2013.01); *H04N 23/53* (2023.01); *H04N 23/635* (2023.01); *H04N 23/667* (2023.01)

(58) Field of Classification Search
CPC .... H04N 23/632; H04N 5/2628; H04N 23/53; H04N 23/635; H04N 23/667;
(Continued)

(56) References Cited

U.S. PATENT DOCUMENTS

2007/0035616 A1* 2/2007 Lee .................... H04N 1/00411
                                                            358/527
2009/0153649 A1   6/2009 Hirooka et al.
(Continued)

FOREIGN PATENT DOCUMENTS

CN              110401766 A      11/2019
KR       10-2016-0150539 A       12/2016
(Continued)

OTHER PUBLICATIONS

Extended European Search Report dated Nov. 7, 2023, issued in European Patent Application No. 21853632.4.

*Primary Examiner* — Timothy J Henn
(74) *Attorney, Agent, or Firm* — Jefferson IP Law, LLP

(57) ABSTRACT

An electronic device and a method for controlling a screen thereof is provided. The electronic device includes a flexible display, an image sensor, at least one processor, and a memory, wherein the memory may store instructions that, when executed, cause the at least one processor to display a first preview image on the flexible display in response to activation of the image sensor, divide the flexible display into at least two regions in response to detecting a designated first event, display a second preview image in a first region among the divided regions, and display at least one captured image in a second region among the divided regions, wherein the second region may include at least one first control menu varying based on a property of the at least one captured image.

23 Claims, 22 Drawing Sheets

(51) Int. Cl.
*H04N 23/53* (2023.01)
*H04N 23/667* (2023.01)

(58) Field of Classification Search
CPC .. H04N 5/2621; H04N 5/2624; H04N 23/631; H04N 23/633; H04N 23/63; H04N 23/54; H04N 23/57; H04N 23/62; G06F 2203/04803; G06F 1/1618; G06F 1/1624; G06F 1/1652; G06F 1/1677; G06F 1/1686; G06F 3/0481; G06F 3/0482; G09G 2340/0464; G09G 2354/00; G09G 2380/02; H04M 1/0214; H04M 1/0235; H04M 1/0268; H04M 2250/52; H04M 1/0241
See application file for complete search history.

(56) References Cited

U.S. PATENT DOCUMENTS

| | | | | |
|---|---|---|---|---|
| 2014/0285476 | A1* | 9/2014 | Cho | H04M 1/0268 345/204 |
| 2015/0227225 | A1* | 8/2015 | Park | G06F 1/1652 345/173 |
| 2016/0259514 | A1* | 9/2016 | Sang | G06F 3/0487 |
| 2016/0373654 | A1 | 12/2016 | Kwon et al. | |
| 2017/0034446 | A1 | 2/2017 | Park et al. | |
| 2017/0094168 | A1 | 3/2017 | Kang et al. | |
| 2017/0177096 | A1 | 6/2017 | Cheong et al. | |
| 2018/0039387 | A1* | 2/2018 | Cheong | H04W 4/029 |
| 2018/0275770 | A1 | 9/2018 | Kang et al. | |
| 2019/0042066 | A1* | 2/2019 | Kim | H04M 1/725 |
| 2020/0012324 | A1 | 1/2020 | Sung et al. | |
| 2021/0392255 | A1* | 12/2021 | Zhu | H04N 23/63 |
| 2022/0019345 | A1* | 1/2022 | Li | G06F 1/1647 |
| 2022/0222027 | A1* | 7/2022 | Zhang | H04M 1/0241 |
| 2022/0321795 | A1* | 10/2022 | Jiang | H04N 5/2624 |

FOREIGN PATENT DOCUMENTS

| | | |
|---|---|---|
| KR | 10-2017-0015089 A | 2/2017 |
| KR | 10-2017-0038308 A | 4/2017 |
| KR | 10-2017-0038365 A | 4/2017 |
| WO | 2019/104486 A1 | 6/2019 |

* cited by examiner

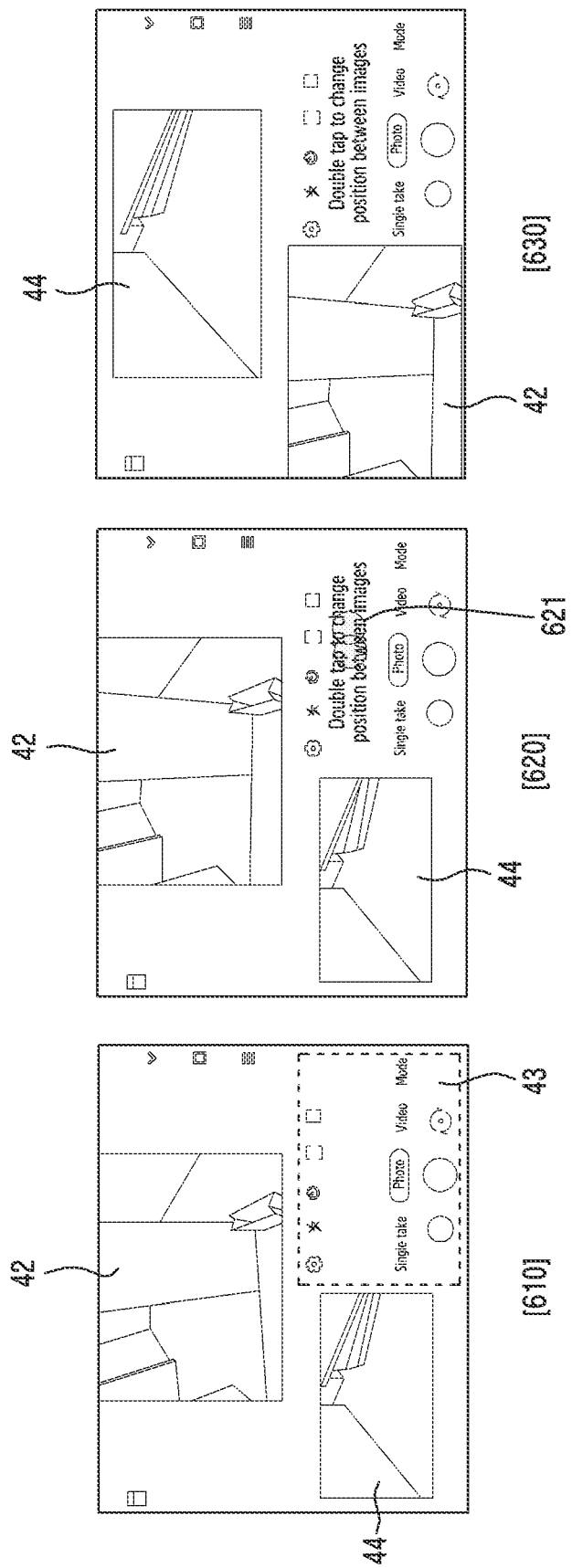

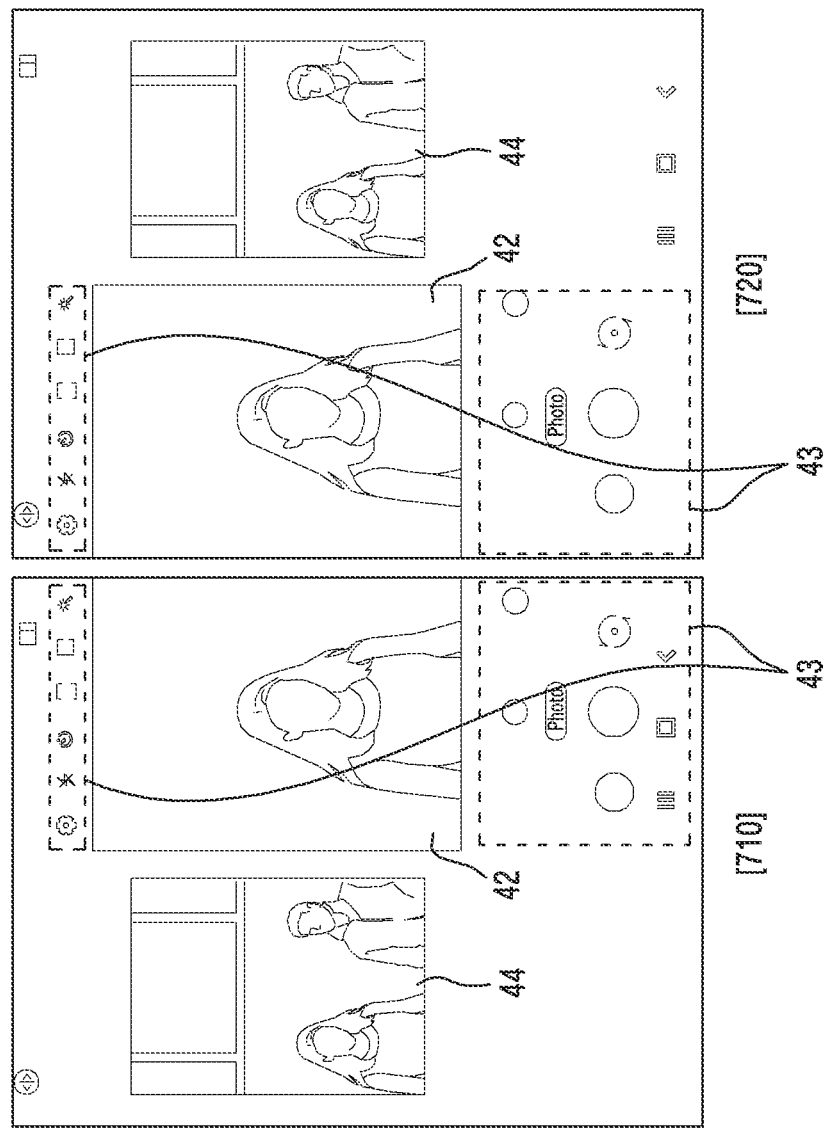

ELECTRONIC DEVICE AND METHOD FOR CONTROLLING SCREEN THEREOF

CROSS-REFERENCE TO RELATED APPLICATION(S)

This application is a continuation application, claiming priority under § 365(c), of an International application No. PCT/KR2021/010085, filed Aug. 2, 2021, which is based on and claims the benefit of a Korean patent application number 10-2020-0097579, filed on Aug. 4, 2020, in the Korean Intellectual Property Office, the disclosure of which is incorporated by reference herein in its entirety.

BACKGROUND

1. Field

The disclosure relates to an electronic device and a method for controlling a screen thereof.

2. Description of Related Art

Electronic devices (for example, mobile terminals, smartphones, or wearable terminals) may provide various functions (for example, an imaging function, a music playback function, a navigation function, a short-range wireless communication (for example, Bluetooth, wireless fidelity (Wi-Fi), or near-field communication (NFC)) function, a fingerprint recognition function, and an electronic payment function).

Meanwhile, various types of electronic devices have recently been provided. For example, foldable or rollable electronic devices including flexible displays have recently been provided.

The electronic devices may provide, through the entire screen, preview images corresponding to images acquired through cameras when the imaging function is activated.

The above information is presented as background information only to assist with an understanding of the disclosure. No determination has been made, and no assertion is made, as to whether any of the above might be applicable as prior art with regard to the disclosure.

SUMMARY

Since the preview images are provided through the entire screen, the user of the electronic device cannot instantly check captured images while the imaging function is activated, but has to check captured images through a separate application. The user may be inconvenienced by such a process of switching the screen to check captured images.

Aspects of the disclosure are to address at least the above-mentioned problems and/or disadvantages and to provide at least the advantages described below. Accordingly, an aspect of the disclosure is to provide an electronic device and a method for controlling a screen thereof, wherein preview images and captured images can be provided together.

Additional aspects will be set forth in part in the description which follows and, in part, will be apparent from the description, or may be learned by practice of the presented embodiments.

In accordance with an aspect of the disclosure, an electronic device is provided. The electronic device includes a flexible display, an image sensor, at least one processor, and a memory, wherein the memory stores instructions that, when executed, cause the at least one processor to display a first preview image on the flexible display in response to activation of the image sensor, divide the flexible display into at least two regions in response to detecting a designated first event, display a second preview image in a first region among the divided regions, and display at least one captured image in a second region among the divided regions, wherein the second region includes at least one first control menu configured to vary based on a property of the at least one captured image.

In accordance with another aspect of the disclosure, a method for controlling a screen of an electronic device is provided. The method includes displaying a first preview image on a display in response to activation of an image sensor, dividing the display into at least two regions in response to detecting a designated first event, displaying a second preview image in a first region of the divided regions, and displaying at least one captured image in a second area of the divided regions, wherein the second region includes at least one first control menu configured to vary based on a property of the at least one captured image.

In accordance with another aspect of the disclosure, an electronic device is provided. The electronic device includes a flexible display, an image sensor, at least one sensor configured to detect a state change of the flexible display, at least one processor, and a memory, wherein the memory stores instructions that, when executed, cause the at least one processor to display, in a first state in which a partial region of the flexible display is activated, a first preview image in the partial region of the flexible display in response to activation of the image sensor, identify, through the at least one sensor, a change to a second state in which a region for displaying a screen of the flexible display is increased, dividing the increased region of the flexible display into at least two regions in response to the change to the second state, displaying a second preview image in a first region among the divided regions, and displaying at least one captured image in a second region among the divided regions, wherein the second region includes at least one control menu configured to vary based on a property of the at least one captured image.

An electronic device according to various embodiments may display preview images together with captured images such that the user can easily check the captured images, thereby improving user convenience. In addition, various embodiments may provide an imaging environment (for example, a user interface) optimized for a foldable (or rollable) electronic device having a relatively large display, thereby improving the user's satisfaction with the foldable (or rollable) electronic device.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 6 is a diagram illustrating an example in which positions of images of an electronic device are changed according to an embodiment of the disclosure;

FIG. 7A is a diagram for illustrating an example in which a screen of an electronic device is controlled based on a gripped state, according to an embodiment of the disclosure;

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art t will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
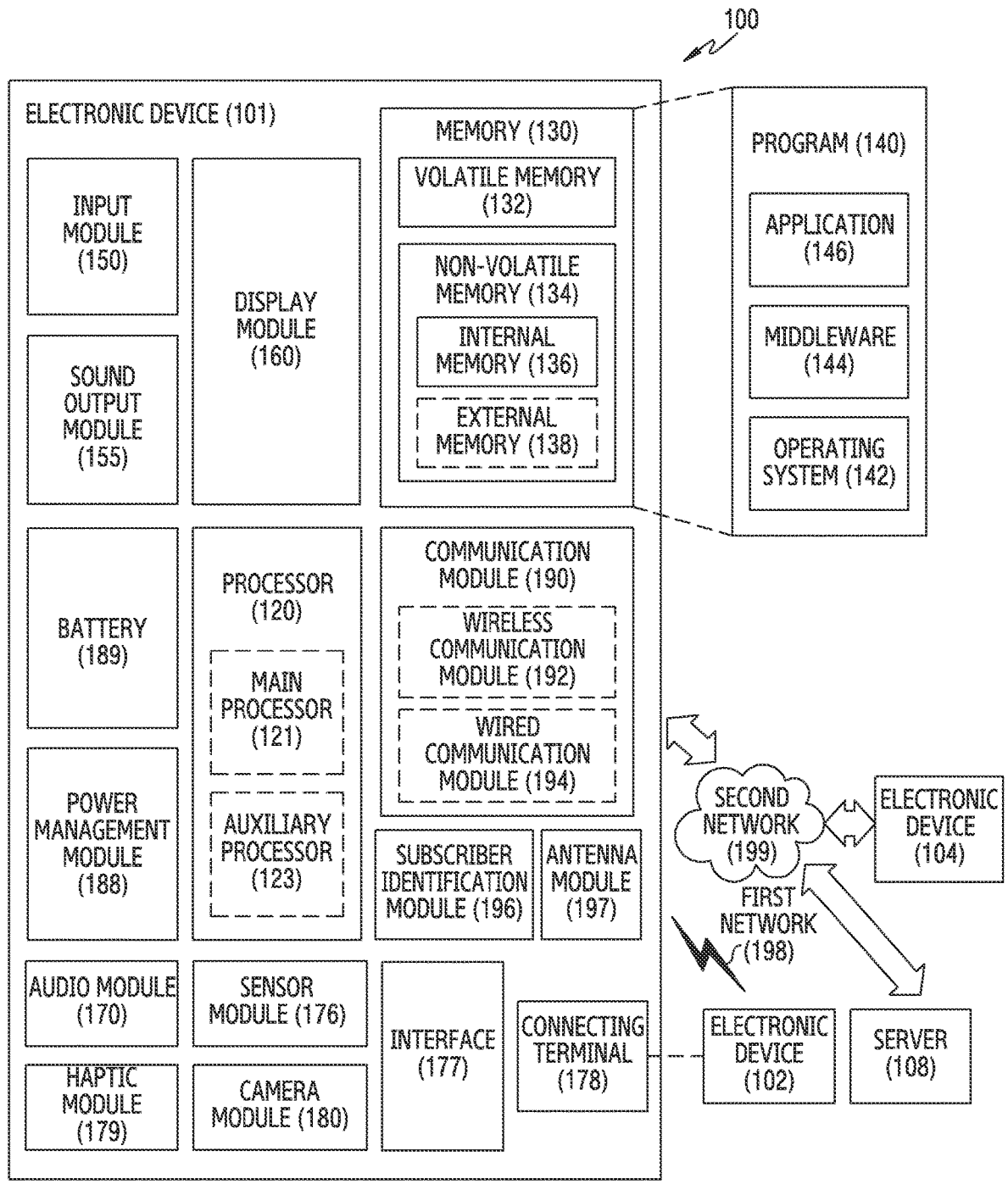
FIG. 1 is a block diagram of an electronic device in a network environment, according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture an image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN))). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
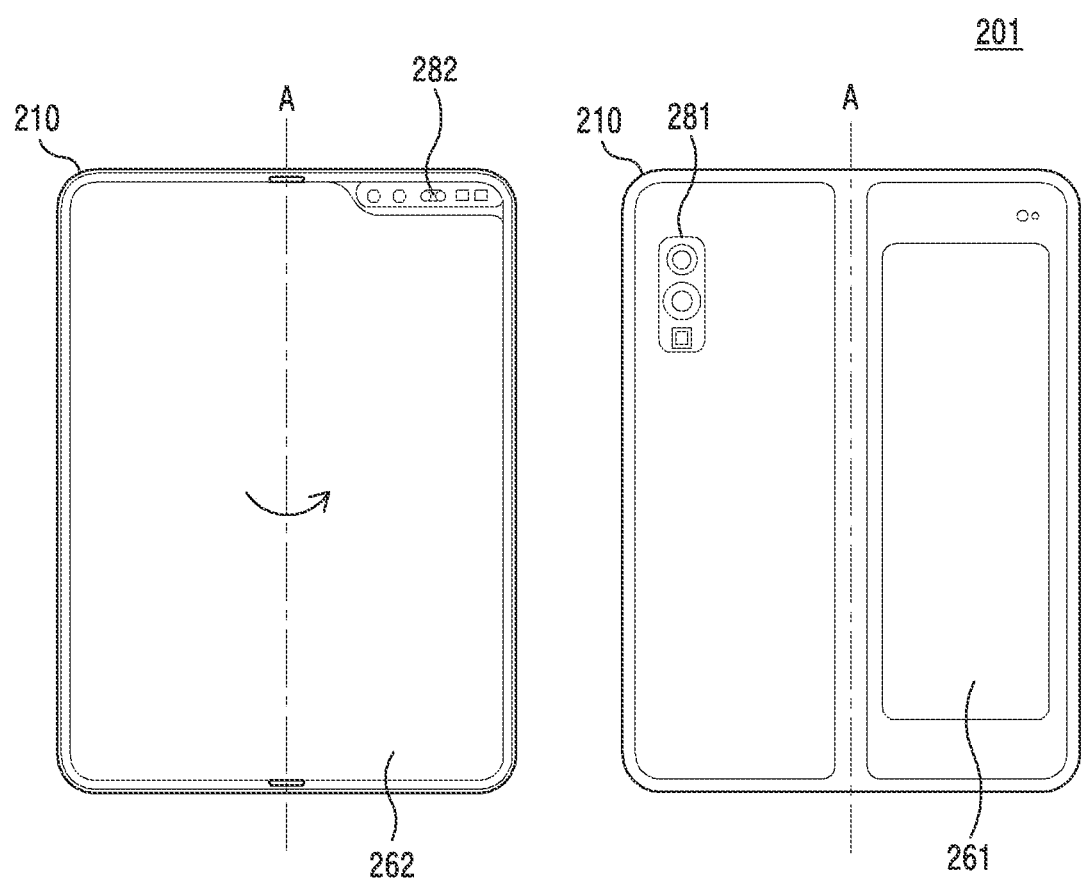
FIG. 2A illustrates an example of a foldable electronic device which is in-folded in the vertical direction, according to an embodiment of the disclosure.

FIG. 2A illustrates an example of an in-folding type foldable electronic device according to an embodiment of the disclosure.

Figure 2B:
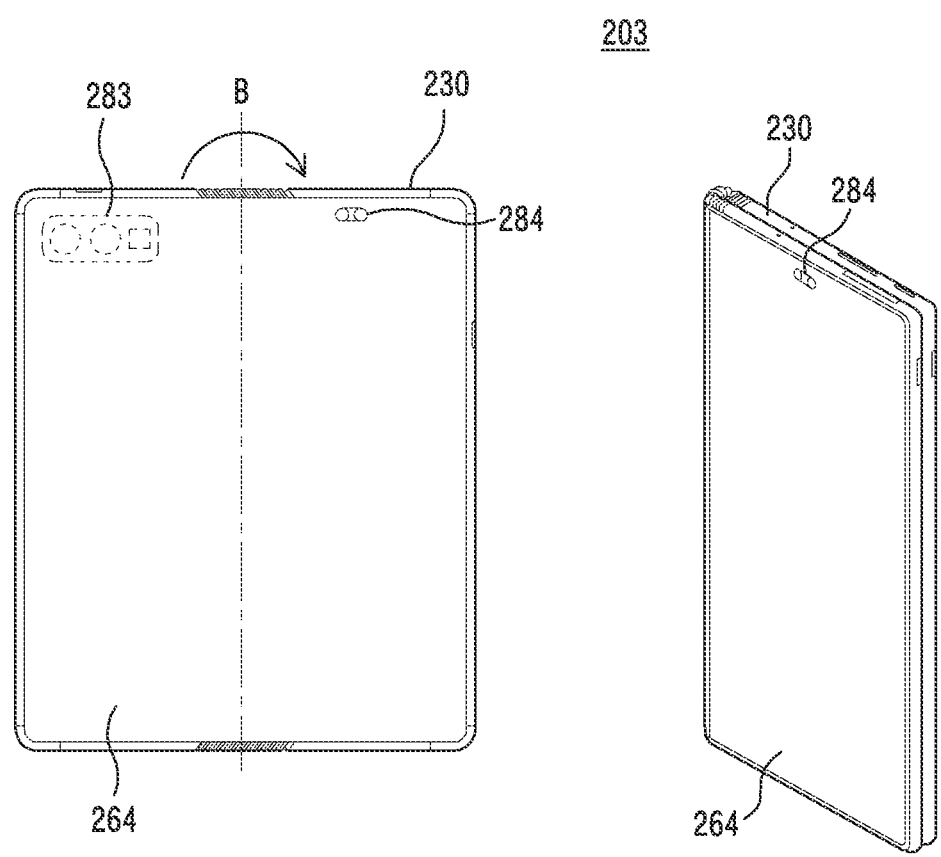
FIG. 2B illustrates an example of a foldable electronic device which is out-folded in the vertical direction, according to an embodiment of the disclosure.

FIG. 2B illustrates an example of an out-folding type foldable electronic device according to an embodiment of the disclosure.

Figure 2C:
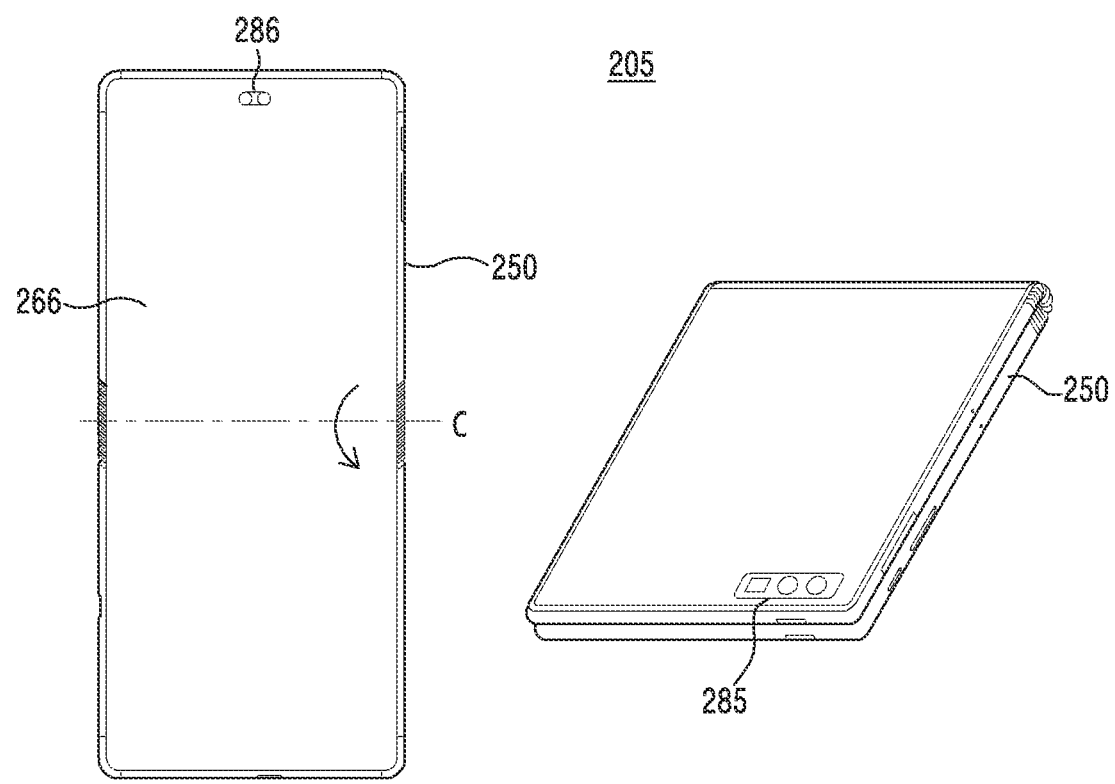
FIG. 2C illustrates a foldable electronic device which is in-folded in the transverse direction, according to an embodiment of the disclosure.

FIG. 2C illustrates a foldable electronic device that is in-folded in the transverse direction according to an embodiment of the disclosure.

Figure 2D:
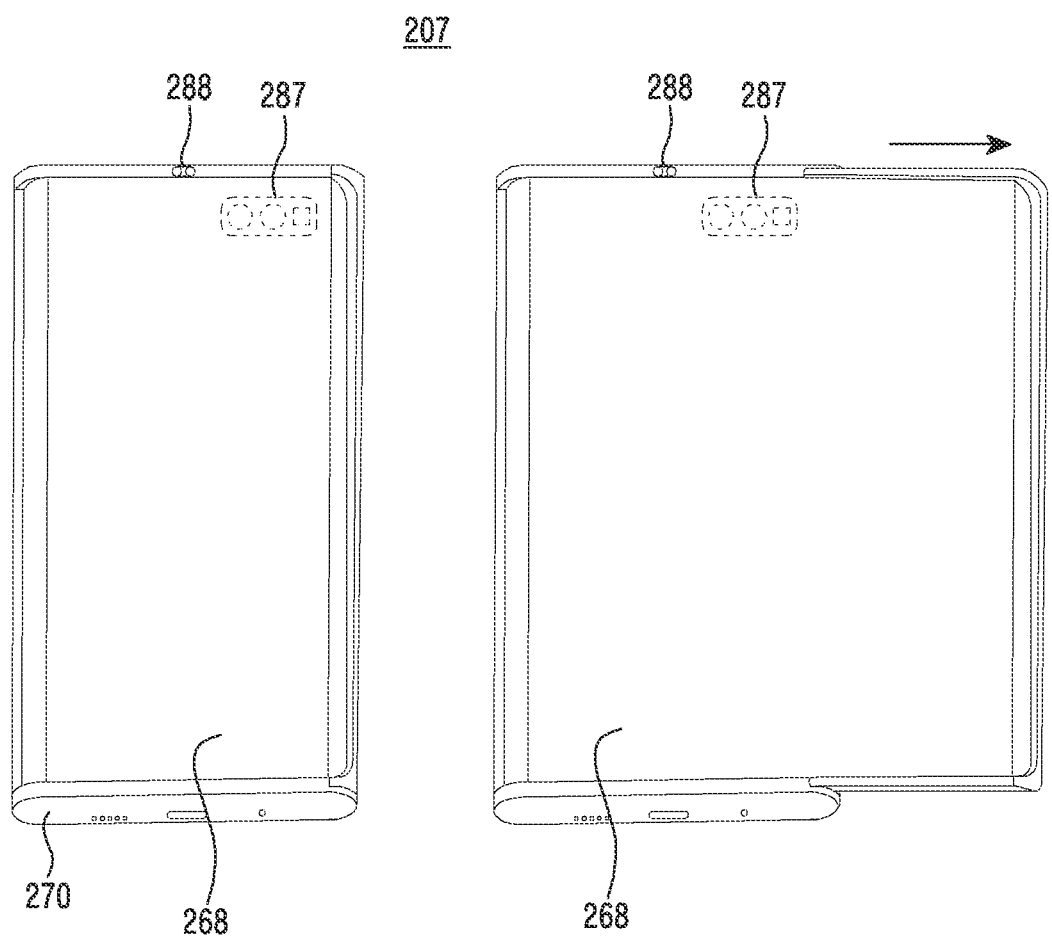
FIG. 2D illustrates a rollable electronic device according to an embodiment of the disclosure.

FIG. 2D illustrates a rollable electronic device according to an embodiment of the disclosure.

Referring to FIGS. 2A to 2D, an electronic device (e.g., electronic device 101) according to various embodiments may include a flexible display. For example, the electronic device may include a foldable electronic device that may be folded in at least one direction or a rollable electronic device that may be rolled.

According to one embodiment, an electronic device 201 (hereinafter, referred to as a first electronic device) may be vertically in-folded as shown in FIG. 2A. The first electronic device 201 may include a first display 261 and a first camera module 281, which are disposed on the rear surface thereof, and a second display 262 and a second camera module 282 for selfies, which are disposed on the front surface thereof. The first display 261 may have a first size and may be a non-flexible display. The first display 261 may be referred to as an external display, an auxiliary display, a sub display, or a cover display. The second display 262, which is a main display having a second size larger than the first size and located on the front surface of a housing 210 of the first electronic device 201, may be a flexible display (or a foldable display). For example, the second display 262 may be in-folded along an A-axis. According to an embodiment, the first electronic device 201 may be in-folded and out-folded along the axis A.

According to another embodiment, an electronic device 203 (hereinafter, referred to as a second electronic device) may be vertically out-folded as shown in FIG. 2B. In the second electronic device 203, a display 264 and a second camera module 284 for selfies may be located (arranged) on the front surface of a housing 230, and a first camera module 283 may be located on the rear surface thereof. The display 264, which is a flexible display, may be out-folded along a B-axis. According to an embodiment, the second electronic device 203 may be out-folded and in-folded along the B-axis.

According to another embodiment, an electronic device 205 (hereinafter, referred to as a third electronic device) may be in-folded in the transverse direction as shown in FIG. 2C. In the third electronic device 205, a display 266 and a second camera module 286 for selfies may be located on the front surface, and a first camera module 285 may be located on the rear surface. The display 266 may be in-folded along a C-axis of housing 250. According to an embodiment, the third electronic device 205 may be out-folded along the C-axis. According to another embodiment, the third electronic device 205 may be in-folded and out-folded along the C-axis.

According to another embodiment, in an electronic device 207 (hereinafter, referred to as a fourth electronic device) as shown in FIG. 2D, at least a portion of a display 268 may be rolled on a housing 270 such that the same is not exposed to the outside. In addition, a portion of the display 268 that has been rolled may be unrolled to be exposed to the outside. In the fourth electronic device 207, a first camera module 287 may be located on the rear surface, and a second camera module 288 for selfies may be located on the front surface.

According to various embodiments, when a photographing function is executed (activated), the electronic devices 201, 203, 205, and 207 may provide (display) a preview image (hereinafter, referred to as a first preview image) through the displays 262, 264, 266, and 268, and when a designated event (e.g., selection of a designated menu, and folding or rolling of the electronic devices) is detected, each of the display 262, 264, 266, and 268 is divided into a plurality of regions so that the electronic devices 201, 203, 205, and 207 may display a preview image (second preview image) and a captured image together. The electronic devices 201, 203, 205, and 207 may provide at least one control menu (function or option) together with a captured image. The at least one control menu, which is a menu related to a captured image, may vary according to a property of the captured image. A detailed description thereof will be described later with reference to FIGS. 3, 4A to 4D, 5A to 5E, 6, 7A, 7B, 8A, 8B, 9A, 9B and 10.

Figure 3:
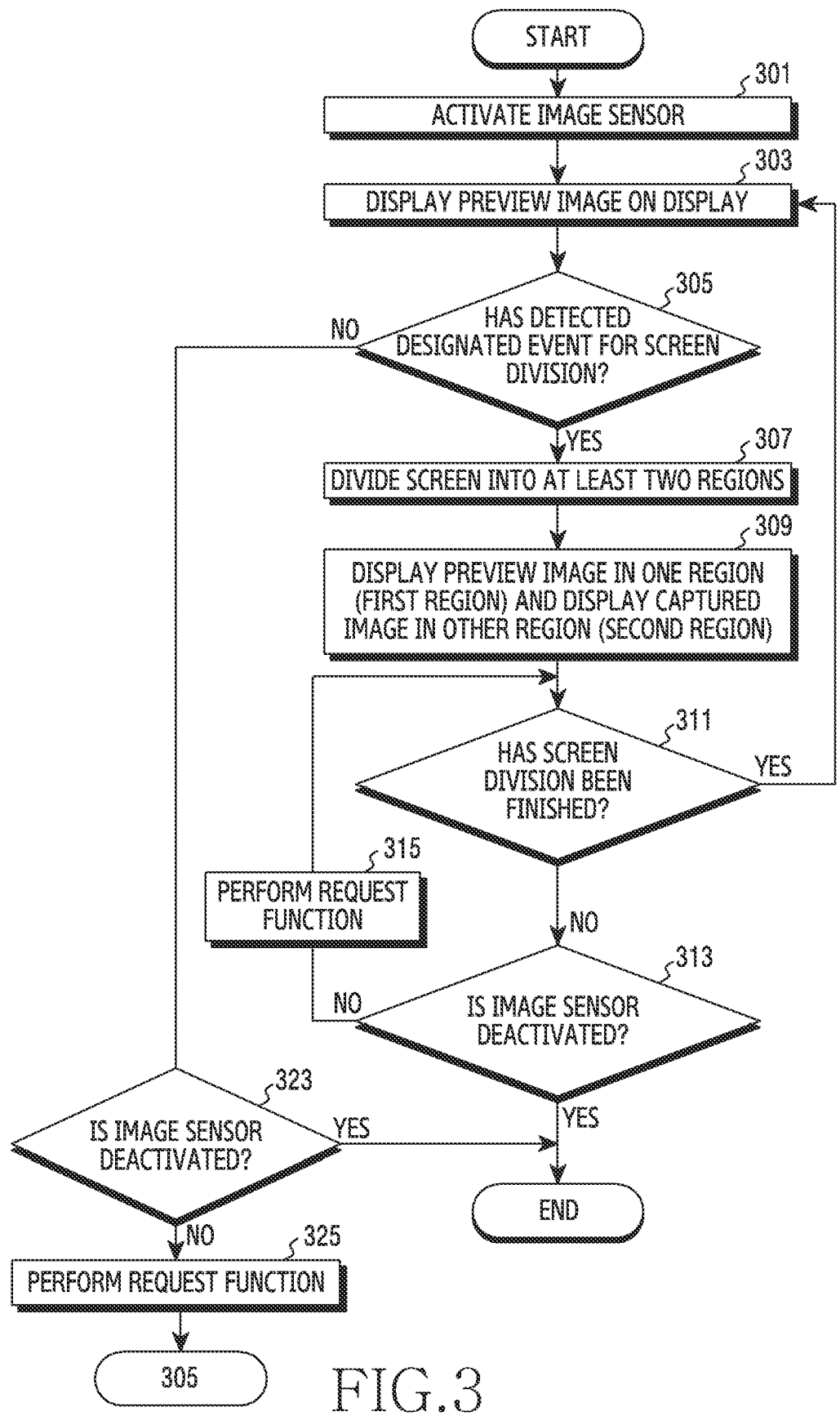
FIG. 3 is a flowchart illustrating a method for controlling a screen of an electronic device according to an embodiment of the disclosure.

FIG. 3 is a flowchart illustrating a method for controlling a screen of an electronic device according to an embodiment of the disclosure.

Figure 4A:
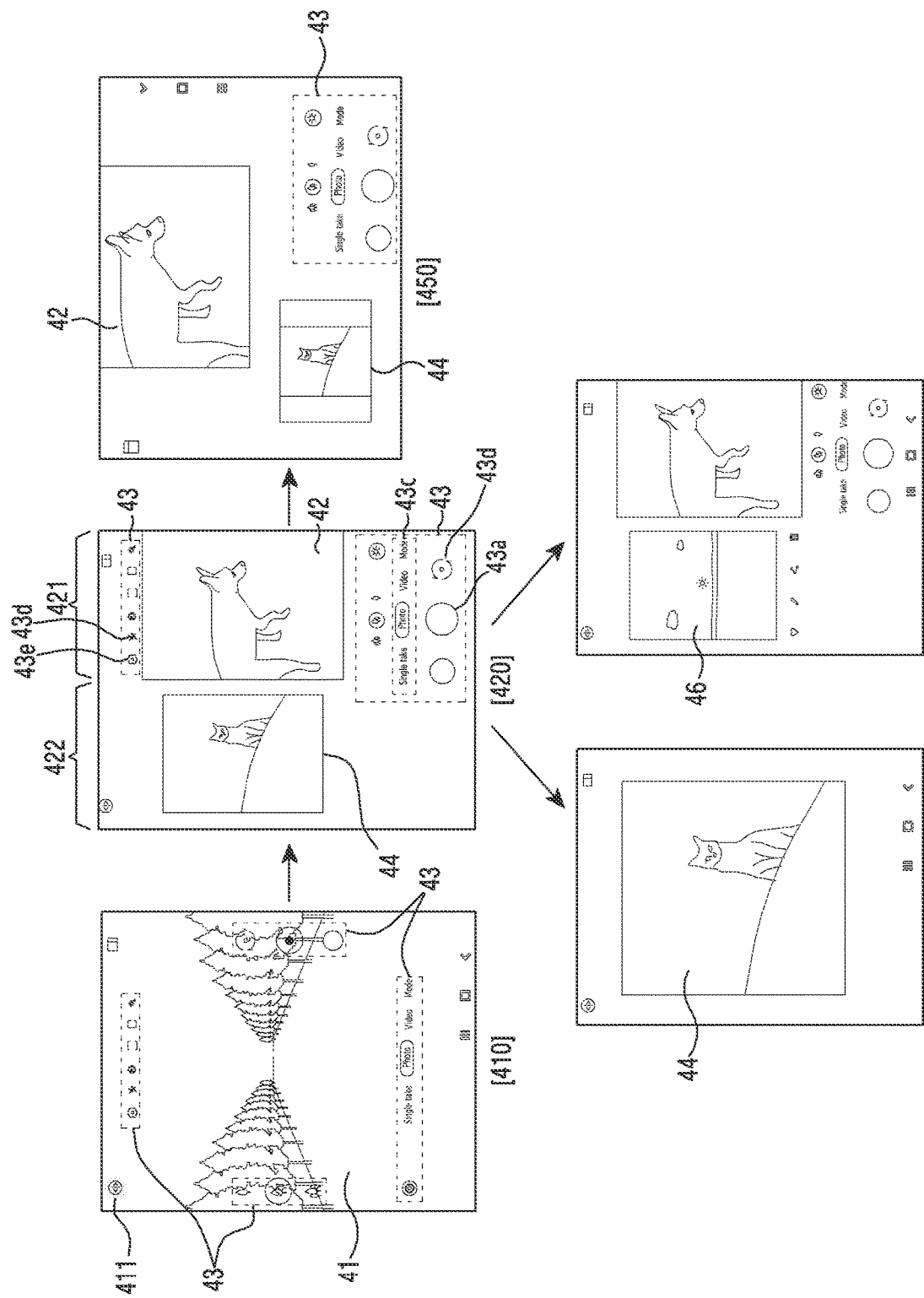
FIG. 4A is a diagram illustrating an example in which a screen of an electronic device is controlled according to an embodiment of the disclosure.

FIG. 4A is a diagram illustrating an example in which a screen of an electronic device is controlled according to an embodiment of the disclosure.

Figure 4B:
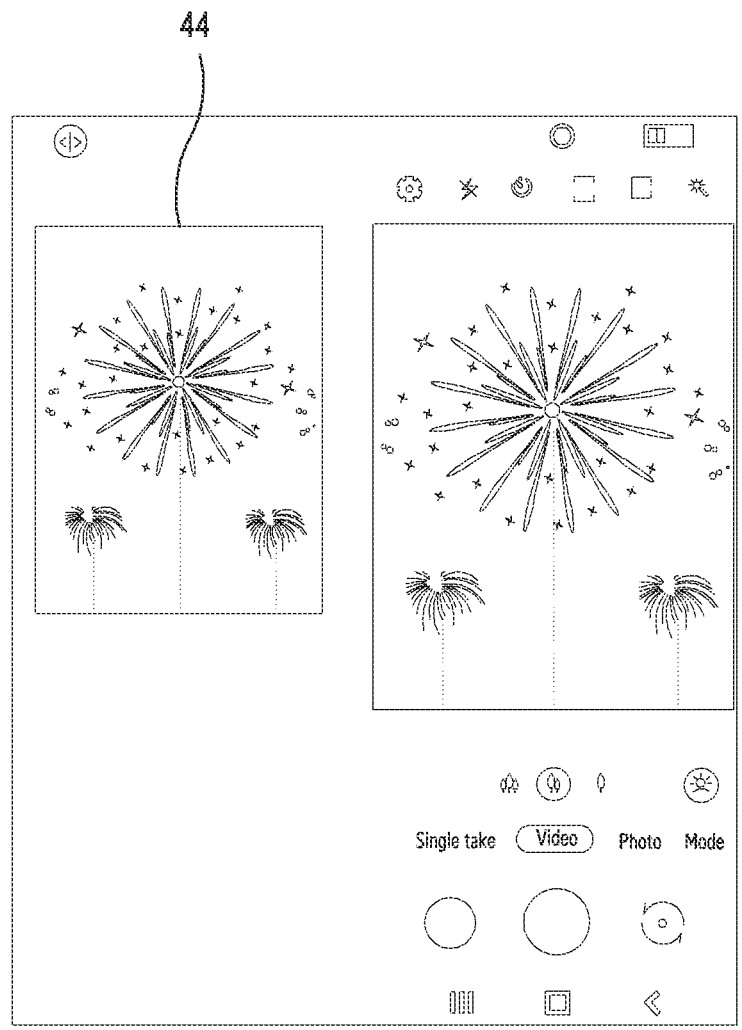
FIG. 4B is a diagram illustrating an example in which a screen of an electronic device is controlled according to an embodiment of the disclosure.

FIG. 4B is a diagram illustrating an example in which a screen of an electronic device is controlled according to an embodiment of the disclosure.

Figure 4C:
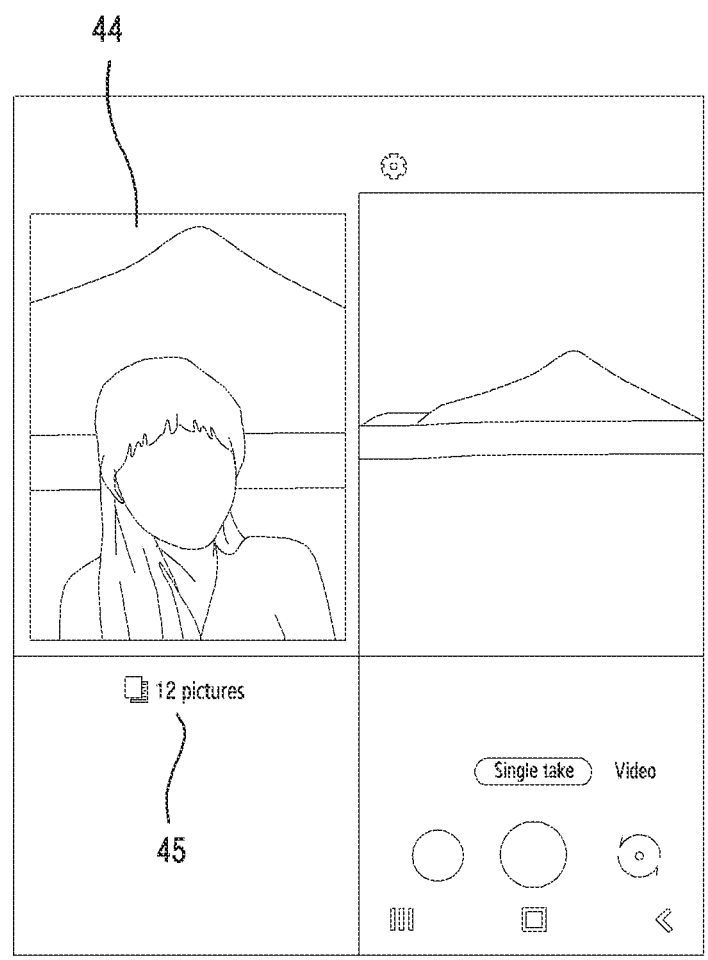
FIG. 4C is a diagram illustrating an example in which a screen of an electronic device is controlled according to an embodiment of the disclosure.

FIG. 4C is a diagram illustrating an example in which a screen of an electronic device is controlled according to an embodiment of the disclosure.

Figure 4D:
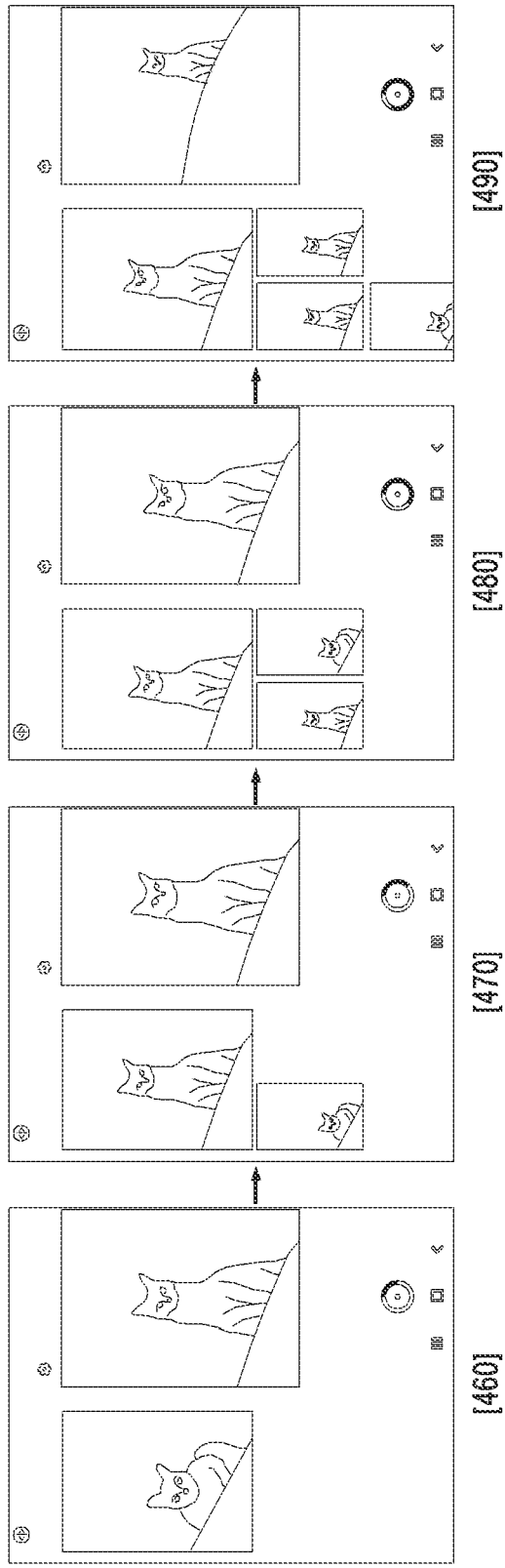
FIG. 4D is a diagram illustrating an example in which a screen of an electronic device is controlled according to an embodiment of the disclosure.

FIG. 4D is an diagram illustrating an example in which a screen of an electronic device is controlled according to an embodiment of the disclosure.

Referring to FIGS. 3 and 4A to 4D, a processor (e.g., a processor 120 of FIG. 1) of an electronic device (e.g., an electronic device 101 of FIG. 1 and the first to fourth electronic devices 201, 203, 205, and 207 of FIGS. 2A to 2D) according to one embodiment may activate an image sensor (e.g., a camera module 180 of FIG. 1 and first camera modules 281, 283, 285, and 287 of FIGS. 2A to 2D) in operation 301. For example, the processor may activate the image sensor in response to the execution of a photographing function.

According to various embodiments, the processor may display a preview image 41 (hereinafter, referred to as a first preview image) on a display (e.g., the display module 160 and the displays 262, 264, 266, and 268) in operation 303. The first preview image 41 may be displayed in a full screen on the display, as shown in FIG. 4A and given reference numeral 410. The first preview image 41 may include at least one control menu 43 for controlling photographing.

According to various embodiments, the processor may identify in operation 305 whether a designated event (hereinafter, referred to as a first event) is detected. For example, as shown in FIG. 4A and given reference numeral 410, the processor may identify whether a user input for selecting (touching) a screen division menu (or icon) 411 for screen division in the first preview image 41 is detected. As another example, the processor may identify whether the electronic device is folded (or unfolded after having been folded). As another example, the processor may identify whether the electronic device is rolled (or unrolled after having been rolled). However, various embodiments not limited thereto, and the specific event may be configured in various ways.

As a result of the identification in operation 305, when the first event is not detected, the processor may proceed to operation 323 to be described later. As a result of the identification in operation 305, when the first event is detected, the processor may divide a screen into at least two regions in operation 307. For example, the processor may divide the screen such that the divided regions have equal or unequal sizes.

According to various embodiments, in operation 309, the processor may display a preview image (hereinafter, referred to as a second preview image) in one region (hereinafter, referred to as a first region) of the divided regions and display a captured image in the other region (hereinafter referred to as a second region) of the divided regions. The captured image may be an image which is previously photographed and stored in a memory (e.g., the memory 130 of FIG. 1) of the electronic device. For example, as shown in FIG. 4A and given reference numeral 420, the processor may divide the screen into two regions and may display, in the first region 421, a second preview image 42 and control menus 43 for controlling photographing and display a captured image 44 in a second region 422. The control menus 43 may include a capture menu 43a, a selfie shoot menu 43b, a shoot mode change menu 43c, a flash on/off menu 43d, and a setting menu 43e. Meanwhile, the control menus illustrated by reference numeral 420 are only examples, and the electronic device may further include at least one other control menu or may not include at least some of the control menus. The captured image 44 may be provided using a preview function.

According to one embodiment, the processor may display the second preview image 42 and the control menus 43 separately in different regions. For example, the processor may transversely divide the first region 421 to generate two regions and may display the second preview image 42 in the upper region and display the control menus 43 in the lower region.

According to one embodiment, the captured image 44 may be displayed to be visually distinguished from the second preview image 42. For example, the captured image 44 may be displayed with the reduction to a specific ratio (e.g., 80%). As another example, the captured image 44 may be displayed with a highlighted edge. The embodiment is not limited thereto, and the captured image 44 may be displayed to be distinguished in various ways.

The captured image 44 may vary according to a current shoot mode. For example, in the case where an image shoot mode is currently selected, the captured image 44 may be a previously stored (or captured) image as shown in FIG. 4A and given reference numeral 420. As another example, in the case of a video shoot mode, the captured image 44 may be a previously stored (or captured) video as shown in FIG. 4B. The processor may play at least a part of the video (video for a designated time (e.g., 10 seconds)) once or repeatedly to prevent a load applied thereto. As another example, in the case of a burst shoot mode, the captured image 44 may be one (e.g., representative image) of images previously obtained by continuous photography, as shown in FIG. 4C. In this case, a text (and/or icon) 45 indicating the number of continuously captured images may be displayed below the captured image 44. According to an embodiment, the processor may display continuously captured images at predetermined intervals. According to another embodiment, a representative image among the continuously captured images may be displayed as a captured image, and other images may be displayed in small sizes below the representative image (see FIG. 5C or 5D).

According to various embodiments, the processor may identify in operation 311 whether screen division is finished. For example, in FIG. 4A and given reference numeral 420, the processor may identify whether a user input for selecting (touching) the screen division menu 411 is detected. As another example, the processor may identify whether the electronic device is folded (or unfolded after having been folded). However, various embodiments are not limited thereto, and the input for terminating the screen division may be configured in various ways (e.g., long touch, double touch, cancel-button input).

As a result of the identification in operation 311, when the screen division is finished, the processor may return to operation 303. As a result of the identification in operation 311, when the screen division is not finished, the processor may identify in operation 313 whether the image sensor is deactivated. For example, the processor may identify whether the photographing function is terminated.

As a result of the identification in operation 313, when the image sensor is deactivated, the processor may terminate screen control according to various embodiments. As a result of the identification in operation 313, when the image sensor is not deactivated, the processor may perform a request function in operation 315. For example, when a first input (e.g., touch input) for the captured image 44 displayed in the second region 422 is detected in the drawing indicated by reference numeral 420, the processor may display the captured image 44 in a full screen as shown in FIG. 4A and given reference numeral 430. According to one embodiment, the processor may separately execute a dedicated viewer application (e.g., GALLERY APPLICATION™) for managing the stored images to display the captured image 44 in a full screen.

As another example, when a second input (e.g., drag input) for the captured image 44 displayed in the second region 422 is detected in the drawing indicated by reference numeral 420, the processor may display another captured image 46 (e.g., previous image or next image) in the second region 422, as shown in FIG. 4A and given reference numeral 440. According to an embodiment, when the captured image is a video, the processor may play the video (e.g., preview playback) in response to a second input (e.g., double touch or long touch). As another example, when the rotation of the electronic device is detected, the processor may change a layout to be suitable for a horizontally long screen as shown in FIG. 4A and given reference numeral 450. For example, the processor may change a layout such that the second preview image 42, the captured image 44, and the control menus 43 are positioned on the upper side, on the lower left, and on the lower right of the screen, respectively.

As another example, when the capture menu 43a is selected, the processor may photograph a subject and display the captured image in the second region 422. According to an embodiment, when the shoot mode is the burst shoot mode, the processor may sequentially display continuously captured images in the second region 422. For example, the processor may display a first captured image in a relatively large size as shown in FIG. 4D and given reference numeral 460 and may display subsequent images in relatively small sizes below the first captured image, as shown by reference numerals 470, 480, and 490. When the continuous photography is completed, the processor may select a representative image from among the continuously captured images according to a designated condition and may change the arrangement thereof so that the representative image is displayed in the largest size among the captured images.

According to various embodiments, the processor may identify in operation 323 whether the image sensor is deactivated. For example, the processor may identify whether the photographing function is terminated. As a result of the identification in operation 323, when the image sensor is deactivated, the processor may terminate screen control according to various embodiments. As a result of the identification in operation 323, when the image sensor is not deactivated, the processor may perform a request function in operation 325. For example, the processor may photograph a subject, change a shoot mode, or turn on a flash according to a user request. Thereafter, the processor may proceed to operation 305.

FIGS. 4A to 4C illustrate that a first region and a second region have the same size. However, according to an embodiment, the first region 421 and the second region 422 may have different sizes.

Figure 5A:
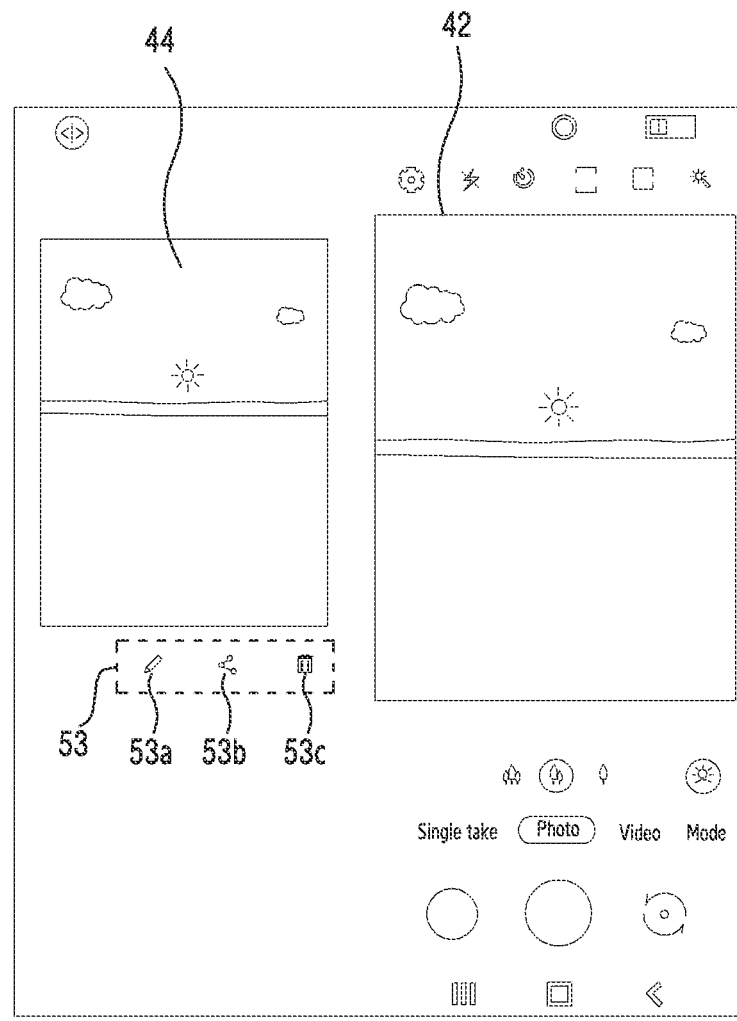
FIG. 5A illustrates an example in which a preview image and a captured image are provided together in an image shoot mode of an electronic device according to an embodiment of the disclosure.

FIG. 5A is a diagram illustrating an example in which a captured image and a preview image are provided together based on a shoot mode of an electronic device according to an embodiment of the disclosure.

Figure 5B:
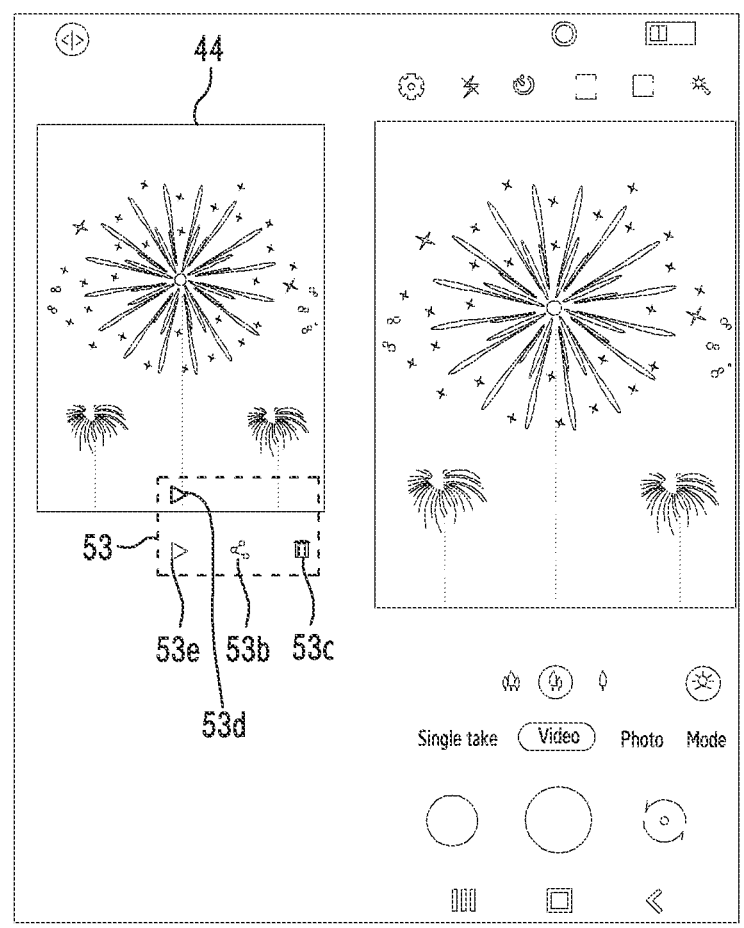
FIG. 5B is a diagram illustrating an example in which a preview image and a captured image are provided together in a video recording mode of an electronic device according to an embodiment of the disclosure.

FIG. 5B is a diagram illustrating an example in which a captured image and a preview image are provided together based on a shoot mode of an electronic device according to an embodiment of the disclosure.

Figure 5C:
FIG. 5C is a diagram illustrating an example in which a preview image and a captured image are provided together in a single-take shoot mode of an electronic device according to an embodiment of the disclosure.

FIG. 5C is a diagram illustrating an example in which a captured image and a preview image are provided together based on a shoot mode of an electronic device according to an embodiment of the disclosure.

Figure 5D:
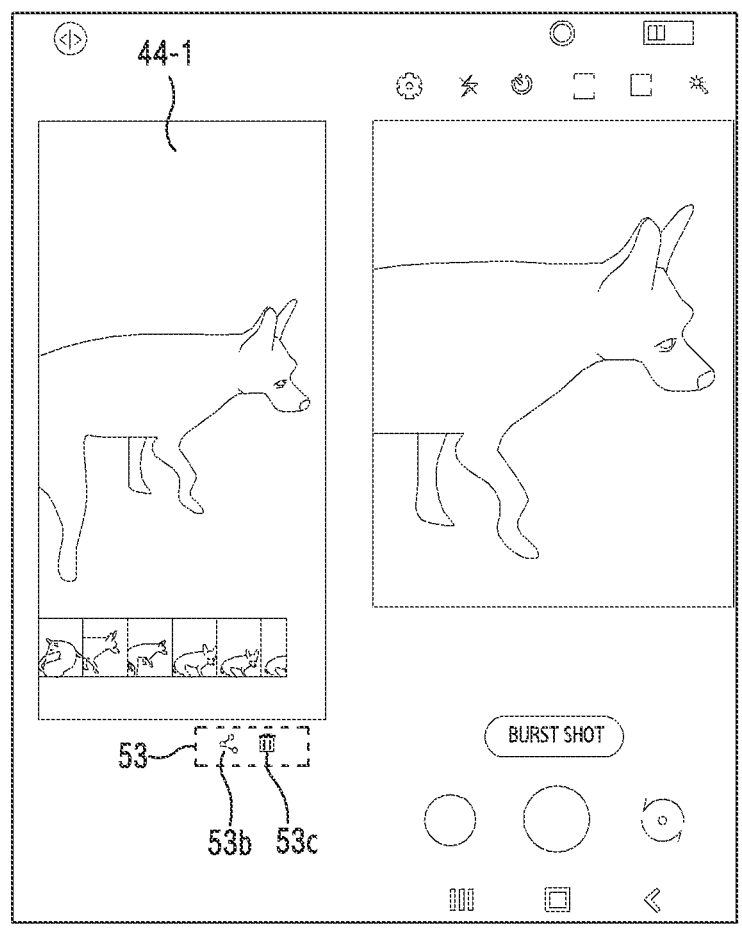
FIG. 5D is a diagram illustrating an example in which a preview image and a captured image are provided together in a burst shoot mode of an electronic device according to an embodiment of the disclosure.

FIG. 5D is a diagram illustrating an example in which a captured image and a preview image are provided together based on a shoot mode of an electronic device according to an embodiment of the disclosure.

Figure 5E:
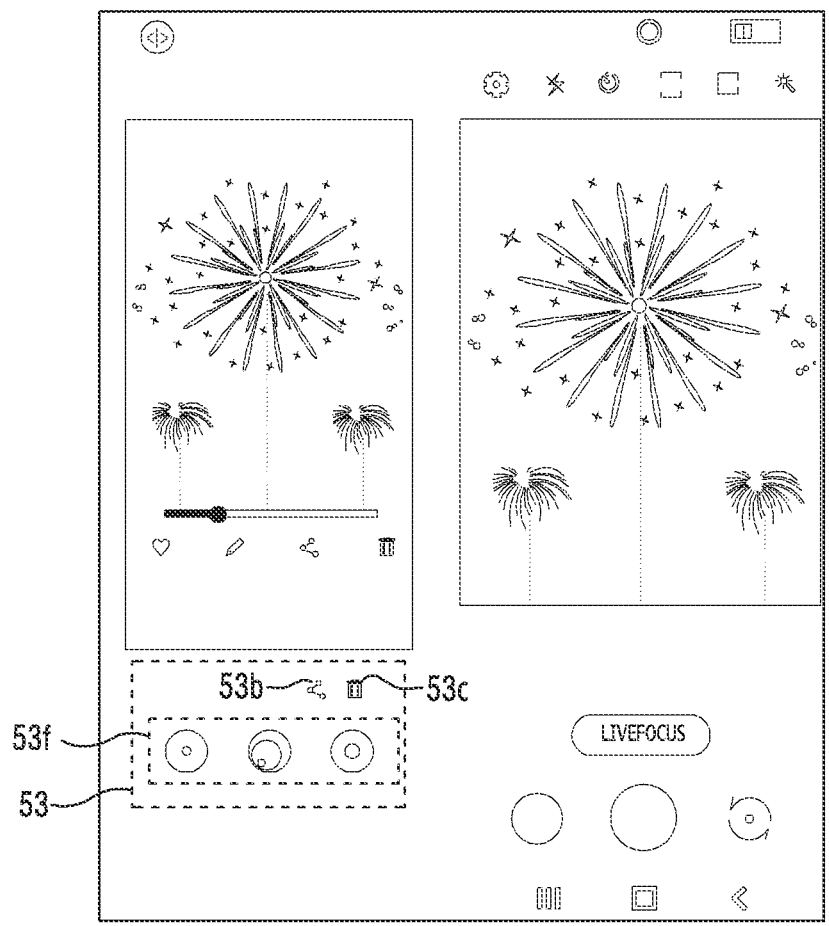
FIG. 5E is a diagram illustrating an example in which a preview image and a captured image are provided together in a live-focus shoot mode of an electronic device according to an embodiment of the disclosure.

FIG. 5E is a diagram illustrating an example in which a captured image and a preview image are provided together based on a shoot mode of an electronic device according to an embodiment of the disclosure.

Referring to FIGS. 5A to 5E, when an electronic device according to an embodiment provides a captured image 44 together with a second preview image 42, the same may further provide at least one control menu 53 related with the captured image 44. The at least one control menu 53 may include at least some of menus provided when an image is checked by a dedicated viewer application (e.g., GALLERY APPLICATION™) and/or at least one new control menu which is not provided by the dedicated viewer application. The at least one control menu 53 may vary according to a property of the captured image 44. For example, when the captured image 44 is an image, the at least one control menu 53 may include an edit menu 53a, a share menu 53b, and a delete menu 53c, as shown in FIG. 5A.

As another example, when the captured image is a video, the at least one control menu 53 may include a share menu 53b, a delete menu 53c, a first playback menu 53d, and a second playback menu 53e, as shown in FIG. 5B. The first playback menu 53d may allow a recorded video to be played on the current screen by using a preview function instead of a video playback application without changing the screen. The second playback menu 53e may allow a recorded video to be played in a full screen through a video playback application. When the captured image 44 is selected (touched), a dedicated viewer application may be executed to display the captured image 44 in a full screen as described in FIG. 4A and give reference numerals 420 and 430. In this case, the processor may play the captured image through the video playback application when a playback command is input to a screen of the dedicated viewer application.

As another example, when the captured image is one of images of various properties (e.g., images photographed in SINGLE-TAKE MODE™) photographed for a certain period of time, the at least one control menu 53 may include a share menu 53b, a delete menu 53c, a first playback menu 53d, and/or a second playback menu 53e, as shown in FIG. 5C. According to an embodiment, when a plurality of images are included, the processor may provide a representative image 44-1 in a size similar to that of the second preview image 42 and may display the remaining images 44-2 in a relatively small size, as shown in FIG. 5C. The share menu 53b and the delete menu 53c may delete only the images selected from among a plurality of images or may delete all images when no images are selected. The first playback menu 53d and/or the second playback menu 53e may be provided when a video is included among images or when a video is selected as a representative image.

As another example, when the captured images are continuously captured images, the at least one control menu 53 may include a share menu 53b and a delete menu 53c as shown in FIG. 5D. The share menu 53b and the delete menu 53c may delete only the images selected from among a plurality of images or may delete all images when no images are selected. According to an embodiment, the control menu 53 may further include a representative image change menu (not shown) for changing the representative image 44-1.

As another example, when the captured image is in a live-focus (out-focus) mode, the at least one control menu 53 may include menus 53f for changing the type and/or intensity of a background effect, as shown in FIG. 5E.

FIG. 6 is a diagram illustrating for an example in which positions of images of an electronic device are changed according to an embodiment of the disclosure.

Referring to FIG. 6, when a designated first event is detected while the photographing function is activated and the first preview image is output, an electronic device (e.g., an electronic device 101 of FIG. 1 and first to fourth electronic devices 201, 203, 205, and 207 of FIGS. 2A to 2D) according to an embodiment may display a captured image 44, a control menu 43, and a second preview image 42 in a designated layout through screen division. For example, as shown by reference numeral 610, the processor may display the captured image 44, the second preview image 42, and the control menus 43 respectively on the upper side, on the lower left, and on lower right of the screen. The second preview image 42 may correspond to an image acquired through a camera module (not shown) positioned on the upper side of the rear surface thereof.

According to various embodiments, when a designated second event (e.g., double touch) is detected, the electronic device may change positions of the captured image 44 and the second preview image 42. For example, as shown by reference numerals 620 and 630, the electronic device may change positions of the captured image 44 and the second preview image 42 when the designated second event (e.g., double touch) is input to a region where text 621 indicating a layout change is displayed. According to an embodiment, the electronic device may further include a layout change menu for changing positions of images.

According to an embodiment, in the state as shown by reference numeral 630, a user may easily perform photographing even if the upper region of the housing in which the camera module (not shown) is located moves, because the second preview image 42 is displayed on the lower left of the housing, which does not move.

FIG. 6 illustrates a case in which an electronic device is placed in a transverse direction. However, the embodiment described in FIG. 6 may be similarly applied to the case in which the electronic device is placed in the vertical direction.

FIG. 7A is a diagram for illustrating an example in which a screen of an electronic device is controlled based on a gripped state, according to an embodiment of the disclosure.

Figure 7B:
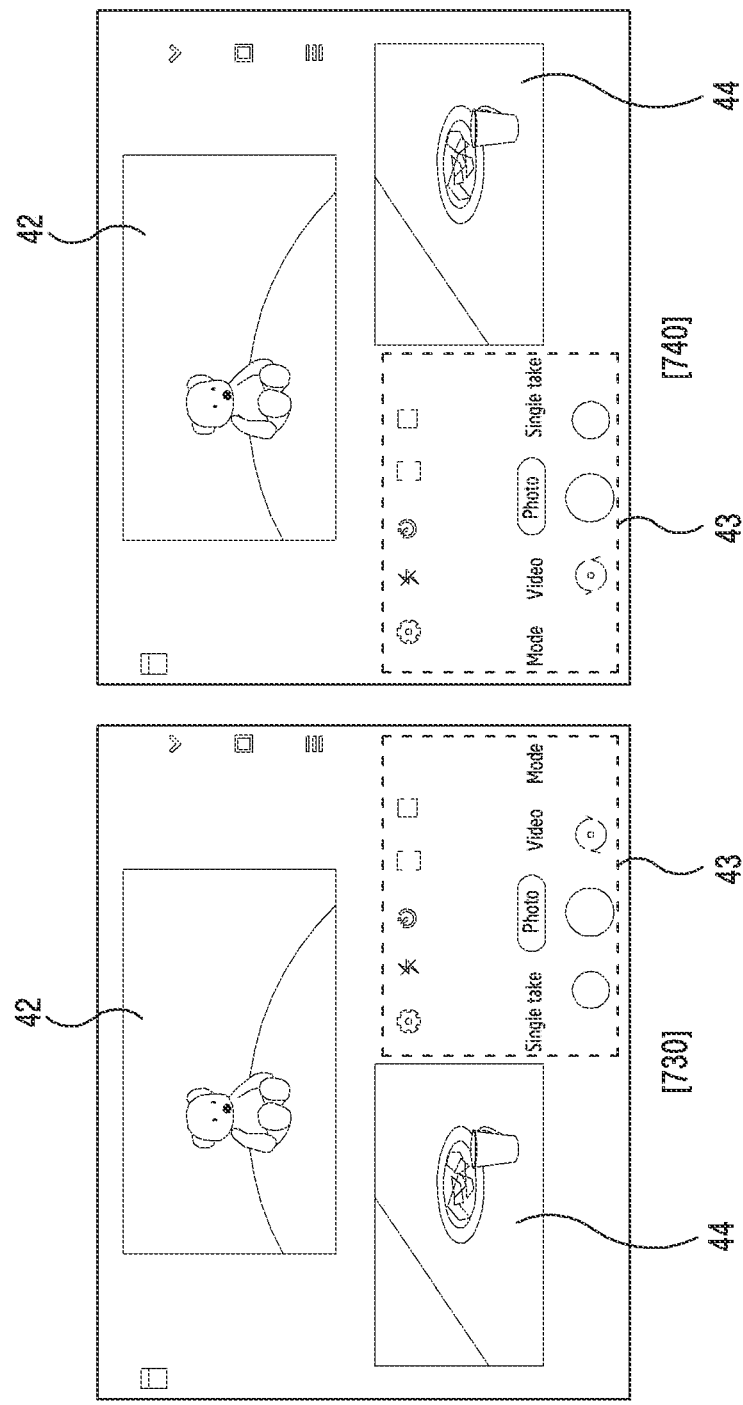
FIG. 7B is a diagram for illustrating an example in which a screen of an electronic device is controlled based on a gripped state, according to an embodiment of the disclosure.

FIG. 7B is a diagram for illustrating an example in which a screen of an electronic device is controlled based on a gripped state, according to an embodiment of the disclosure.

Referring to FIGS. 7A and 7B, an electronic device according to one embodiment may change positions of a captured image and a second preview image according to a state (position) in which a user grips the electronic device. For example, when a user grips the right side of the electronic device with the right hand, the processor may display the second preview image 42 including the control menus 43 on the right side and display the captured image 44 on the left side, as shown in FIG. 7A and given reference numeral 710. In this case, the user can easily select the control menus 43 with the right hand holding the electronic device. Alternatively, when a user grips the left side of the electronic device with the left hand, the processor may display the second preview image 42 including the control menus 43 on the left side and display the captured image 44 on the right side, as shown in FIG. 7A and given reference numeral 720. In this case, the user can easily select the control menus 43 with the left hand holding the electronic device.

As another example, when the user grips the right side of the electronic device with the right hand, the processor may display the second preview image 42 at the upper side, display the control menus 43 on the lower right, and display the captured image 44 on the lower left, as shown in FIG. 7B and given reference numeral 730. In this case, the user can easily select the control menus 43 with the right hand holding the electronic device. Alternatively, when the user grips the left side of the electronic device with the left hand, the processor may display the second preview image 42 on the upper side, display the control menus 43 on the lower left, and display the captured image 44 on the lower right, as shown in FIG. 7B and given reference numeral 740. In this case, the user can easily select the control menus 43 with the left hand holding the electronic device.

The electronic device according to various embodiments may include at least one sensor capable of recognizing a user's gripping state. Alternatively, the electronic device may recognize the user's gripping state through a touch sensor included in a flexible display. For example, the processor may determine that the electronic device is gripped with the left hand when a touch is detected in a designated region (e.g., BM region) of the left end of the flexible display and may determine that the electronic device is gripped with the right hand when a touch is detected in a designated region (e.g., BM region) of the right end thereof.

Figure 8A:
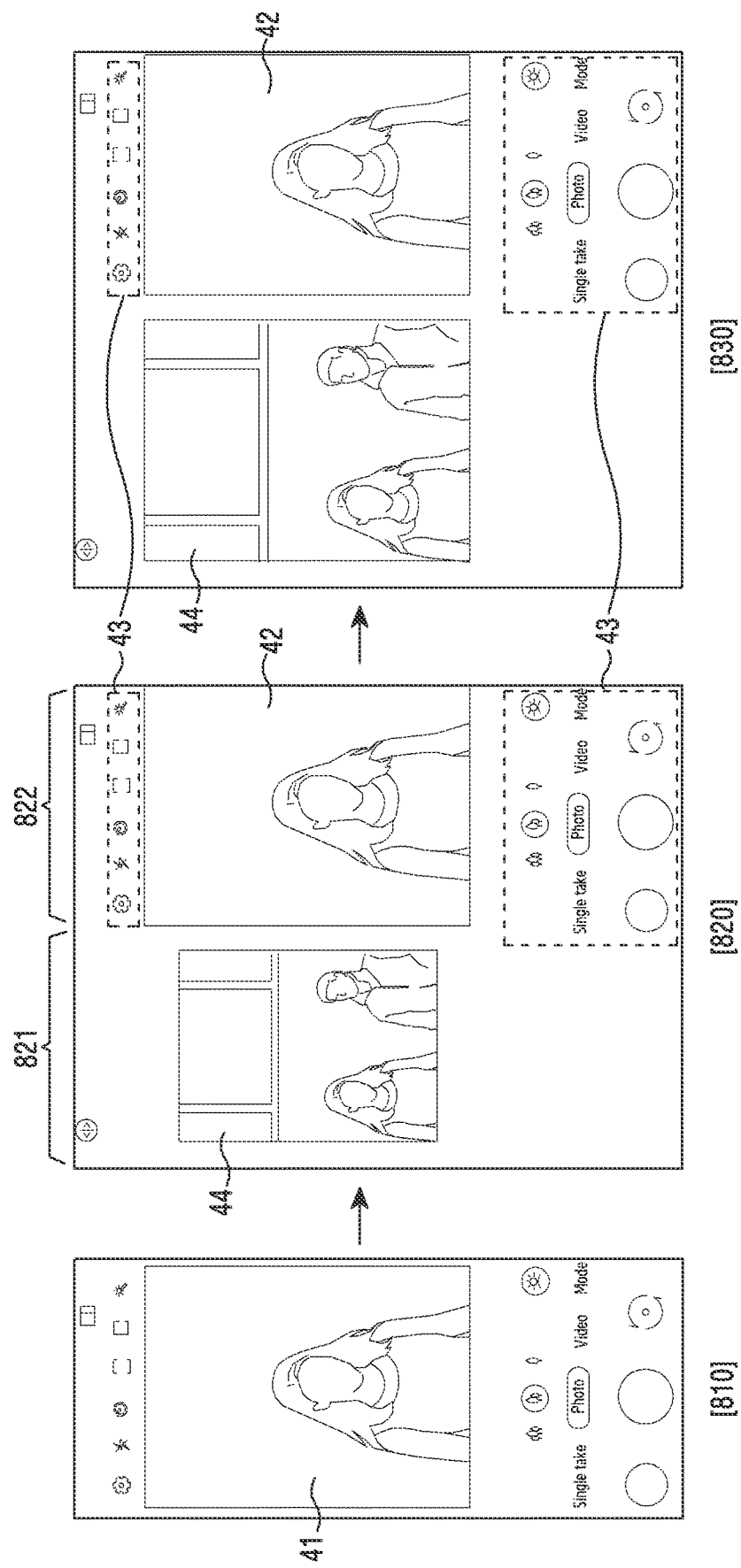
FIG. 8A is a diagram illustrating an example in which a screen of a rollable electronic device is controlled according to an embodiment of the disclosure.

FIG. 8A is a diagram illustrating an example in which a screen of a rollable electronic device is controlled according to an embodiment of the disclosure.

Referring to FIG. 8A, when a photographing function is activated in a first state (e.g., rolled state), a rollable electronic device (e.g., an electronic device 207 of FIG. 2D) according to an embodiment may display a first preview image 41 in a partial region (e.g., region exposed to the outside in a rolled state) of a display, as shown by reference numeral 810.

The rollable electronic device according to various embodiments, when the display is unrolled (e.g., unrolled by a predetermined amount or greater), may divide the display into two regions, display the captured image 44 in the first region 821, and display the second preview image 42 including the control menu 43 in the second region 822, as shown by reference numeral 820.

The size of the first region 821 may be changed in response to the size of the unrolled display. For example, when the display is unrolled to the right to increase the size of the externally exposed region, the first region 821 may be changed (e.g., increased) to correspond to the size of the unrolled display, as shown by reference numeral 830.

FIG. 8A illustrates that the size of the second region 822 is fixed, and the size of the first region 821 varies according to the size of the unrolled display. However, according to an embodiment, the processor may reperform screen division such that the first region 821 and the second region 822 have the same size in response to a change in the size of the display. The processor may reperform screen division such that the first region 821 and the second region 822 have the same size when the size of the display changes by a predetermined size or greater in order to prevent a load due to frequent screen division.

Figure 8B:
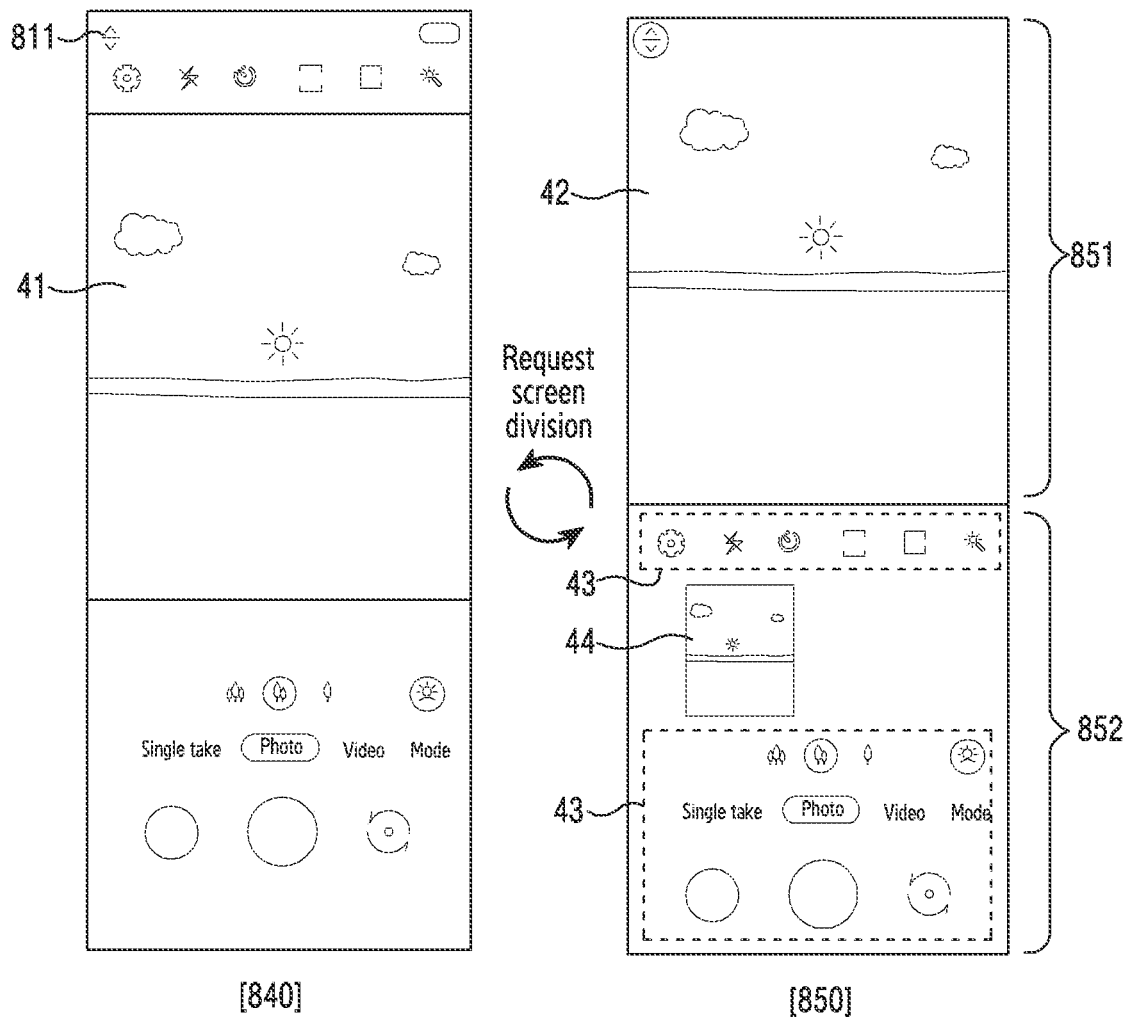
FIG. 8B is a diagram illustrating an example in which a screen of a foldable electronic device is controlled according to an embodiment of the disclosure.

FIG. 8B is a diagram illustrating an example in which a screen of a foldable electronic device is controlled according to an embodiment of the disclosure.

Referring to FIG. 8B, a foldable electronic device (e.g., a third electronic device 205 of FIG. 2C) according to an embodiment may be folded in the transverse direction.

When a photographing function is activated in a first state (e.g., unfolded state), the foldable electronic device according to various embodiments may display the first preview image 41 in a full screen on the display as shown by reference numeral 840.

When the display is folded (or unfolded after having been folded) or the screen division menu 811 is selected (touched), the foldable electronic device according to various embodiments may divide the display into two region, display the second preview image 42 in the first region 851, and display, in the second region 852, the captured image 44 and the control menu 43 for controlling photographing, as shown by reference numeral 850.

Figure 9:
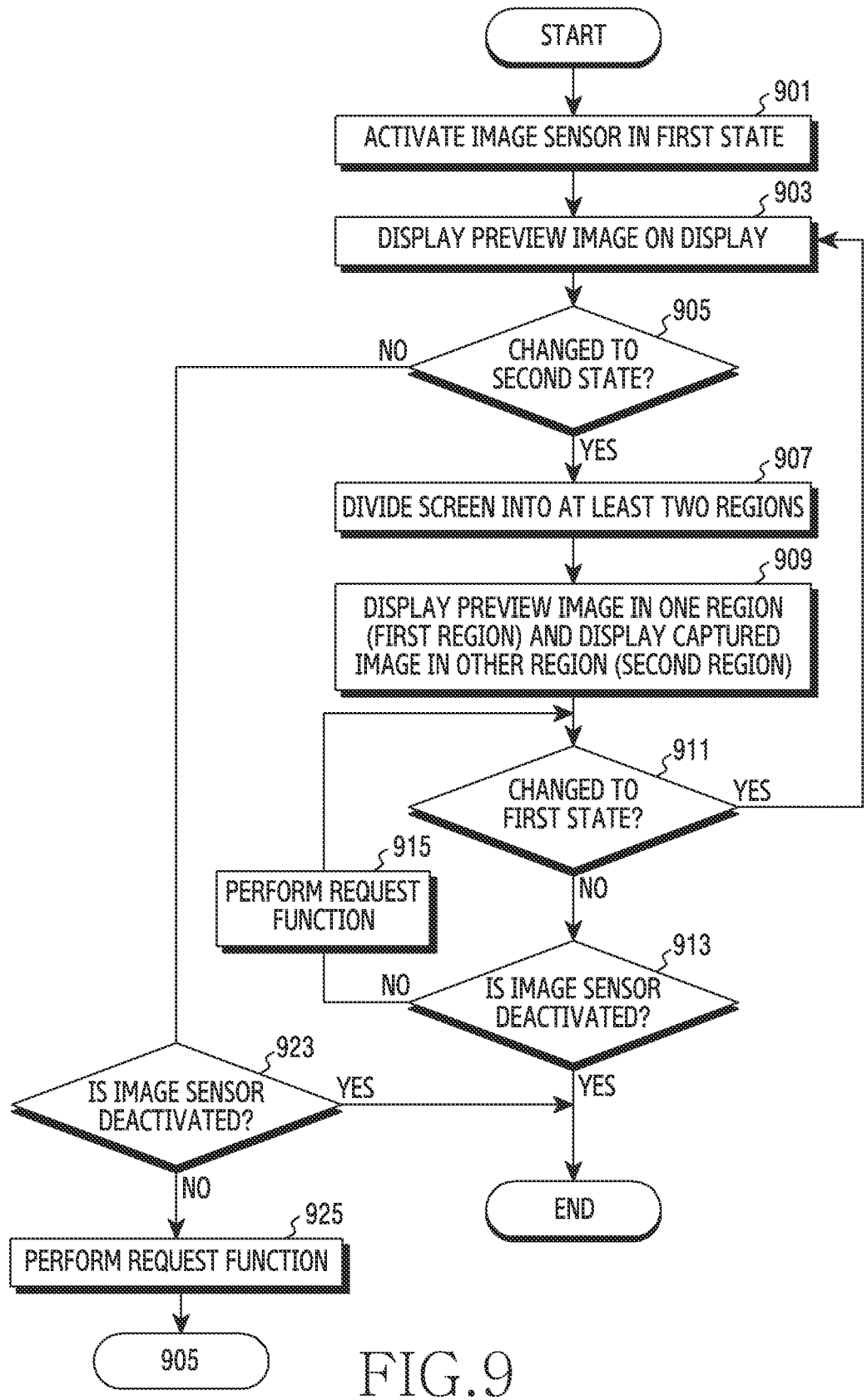
FIG. 9 is a flowchart showing a method for controlling a screen of an electronic device according to an embodiment of the disclosure.

FIG. 9 is a flowchart showing a method for controlling a screen of an electronic device according to an embodiment of the disclosure.

Figure 10:
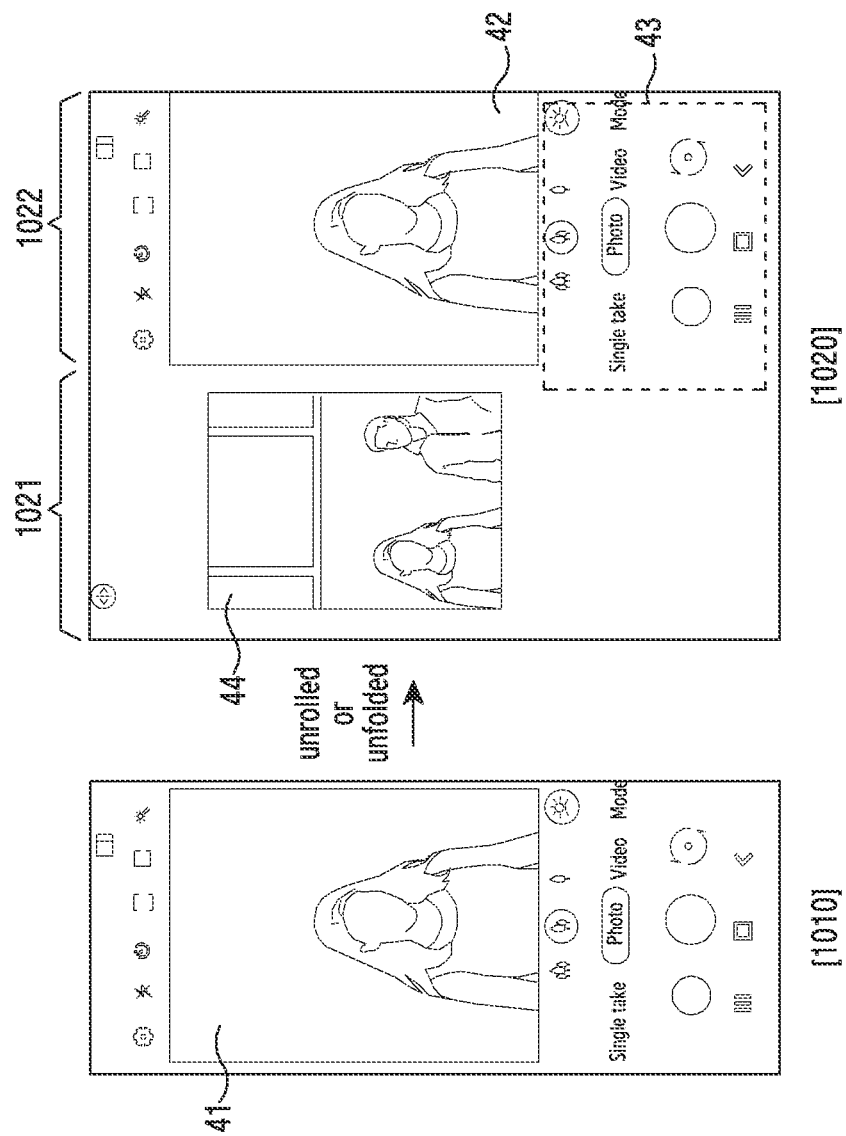
FIG. 10 is a diagram illustrating a method of controlling a screen of an electronic device according to an embodiment of the disclosure.

FIG. 10 is a diagram illustrating a method of controlling a screen of an electronic device according to an embodiment of the disclosure.

Referring to FIGS. 9 and 10, in operation 901, a processor (e.g., a processor 120 of FIG. 1) of an electronic device (e.g., an electronic device 101 of FIG. 1 and first to fourth electronic devices 201, 203, 205, and 207 of FIGS. 2A to 2D) according to one embodiment may activate an image sensor (e.g., a camera module 180 of FIG. 1, and first camera modules 281, 283, 285, and 287 of FIGS. 2A to 2D) in a first state. For example, the processor may activate the image sensor when a photographing function is executed in the first state. The first state may include a state in which a rollable electronic device is rolled and a portion of the display is activated, a state in which an out-folding type foldable electronic device is folded and a portion of the display is activated, or a state in which an in-folding type foldable electronic device is folded and an external display having a small size is activated.

According to various embodiments, the processor may display a preview image (hereinafter, referred to as a first preview image) in operation 903. For example, as shown in FIG. 10 and given reference numeral 1010, the processor may display the first preview image in a full screen in a partial region of a flexible display (e.g., the display module 160 and the displays 264, 266, and 268) or an external display (e.g., the first display 261).

According to various embodiments, the processor may identify a change to a second state in operation 905. For example, the processor may identify whether the electronic device is unfolded or unrolled, through at least one sensor that detects a state change. The second state may refer to a state in which the region of the display for displaying a screen is relatively increased.

As a result of the identification in operation 905, when a change to the second state is not detected, the processor may proceed to operation 923 to be described later. As a result of the identification in operation 905, when a change to the second state is detected, the processor may perform screen division into at least two regions in operation 907. For example, the processor may divide the screen such that the divided regions have equal or unequal sizes.

According to various embodiments, the processor may display a preview image (hereinafter, referred to as a second preview image) in one region (hereinafter, referred to as a first region) of the divided regions and display a captured image in the other region (hereinafter, referred to as a second region) thereof, in operation 909. The captured image may be an image previously photographed and stored in a memory (e.g., the memory 130 of FIG. 1) of the electronic device. For example, as shown in FIG. 10 and given reference numeral 1020, the processor may divide the screen into two regions, display, in the first region 1021, the second preview image 42 and the control menus 43 for controlling photographing, and display the captured image 44 in the second region 1022.

According to one embodiment, the processor may display the second preview image 42 and the control menus 43 separately in different regions. For example, the processor may transversely divide the first region 1021 to generate two regions and may display the second preview image 42 in the upper region and display the control menus 43 in the lower region. According to one embodiment, the captured image 44 may be displayed to be visually distinguished from the second preview image 42. For example, the captured image 44 may be displayed with the reduction to a specific ratio (e.g., 80%). As another example, the captured image 44 may be displayed with a highlighted edge. The embodiment is not limited thereto, and the captured image 44 may be displayed to be distinguished in various ways.

According to various embodiments, the processor may identify a change to a first state in operation 911. For example, the processor may identify whether the electronic device is folded or rolled.

As a result of the identification in operation 911, when the state of the electronic device is changed to the first state, the processor may return to operation 903. As a result of the identification in operation 911, when the state of the electronic device is not changed to the first state, the processor may identify in operation 913 whether the image sensor is deactivated. For example, the processor may identify whether the photographing function is terminated.

As a result of the identification in operation 913, when the image sensor is deactivated, the processor may terminate screen control according to various embodiments. As a result of the identification in operation 913, when the image sensor is not deactivated, the processor may perform a request function in operation 915.

According to various embodiments, the processor may identify in operation 923 whether the image sensor is deactivated. For example, the processor may identify whether the photographing function is terminated. As a result of the identification in operation 923, when the image sensor is deactivated, the processor may terminate screen control according to various embodiments. As a result of the identification in operation 923, when the image sensor is not deactivated, the processor may perform a request function in operation 925. For example, the processor may photograph a subject, change a shoot mode, or turn on a flash according to a user request. Thereafter, the processor may proceed to operation 905.

An electronic device (e.g., the electronic device 101, the first electronic device 201, the second electronic device 203, the third electronic device 205, and the fourth electronic device 207) according to various embodiments may include: a flexible display (e.g., the display module 160, the second display 262, and the displays 264, 266, 268); an image sensor (e.g., the camera module 180 and the first camera modules 281, 283, 285, and 287); at least one processor (e.g., the processor 120); and a memory (e.g., the memory 130). The memory may store instructions that, when executed, cause the at least one processor to: display a first preview image on the flexible display in response to activation of the image sensor; divide the flexible display into at least two regions in response to detecting a designated first event; display a second preview image in one region (hereinafter, referred to as a first region) of the divided regions; and display at least one captured image in the other region (hereinafter, referred to as a second region) of the divided regions. The second region may include at least one first control menu varying based on a property of the at least one captured image.

According to various embodiments, the memory may further store instructions that, when executed, cause the processor to change, in response to detecting a designated second event, a position of a first region for displaying the second preview image and a position of a second region for displaying the at least one captured image.

According to various embodiments, the instruction for dividing the flexible display into at least two regions may include an instruction for further dividing the flexible display such that the flexible display has a third region distinguished from the first region and the second region. The memory may further store instructions that, when executed, cause the processor to display, in the third region, at least one second control menu for controlling image photographing through the image sensor.

According to various embodiments, the memory may further store instructions that, when executed, cause the processor to: identify a user's gripping state with respect to the electronic device by using a touch sensor or a separate sensor included in the flexible display; and determine a position of the first region in which the second preview image is displayed, based on the identified gripping state.

According to various embodiments, the electronic device may include a foldable electronic device or a rollable electronic device.

According to various embodiments, the designated first event may include an event for folding the foldable electronic device, an event for rolling the flexible display of the rollable electronic device, or an event for selecting a designated menu included in the first preview image.

According to various embodiments, the instruction for displaying the at least one captured image in the second region may include an instruction for displaying the at least one captured image by reducing a size thereof by a specific ratio.

According to various embodiments, the first control menu included in the second region may include at least some of third control menus provided by a viewer application that manages a captured image displayed in the second region or at least one of new menus which are not provided by the viewer application.

According to various embodiments, the memory may further store instructions that, when executed, cause the processor to: execute an image playback application corresponding to a captured image displayed in the second region in response to a designated first input detected in the second region; and display the captured image displayed in the second region in a full screen on the flexible display.

According to various embodiments, the memory may further store instructions that, when executed, cause the processor to display a previous image, display a next image, or play a video, in the second region in response to a designated second input detected in the second region.

A method for controlling a screen of an electronic device (e.g., the electronic device 101, the first electronic device 201, the second electronic device 203, the third electronic device 205, and the fourth electronic device 207) according to various embodiments may include: displaying a first preview image on a display (e.g., the display module 160, the second display 262, and the displays 264, 266, and 268) in response to activation of an image sensor (e.g., the camera module 180, and the first camera modules 281, 283, 285, and 287); dividing the display into at least two regions in response to detecting a designated first event; displaying a second preview image in one region (hereinafter, referred to as a first region) of the divided regions; and displaying at least one captured image in the other region (hereinafter, referred to as a second area) of the divided regions. The second region may include at least one first control menu varying based on a property of the at least one captured image.

According to various embodiments, the method may further include changing a position of the first region for displaying the second preview image and a position of the second region for displaying the at least one captured image, in response to detecting a designated second event.

According to various embodiments, the dividing of the display into at least two regions may further include dividing the display such that the display has a third region distinguished from the first region and the second region. The method further includes displaying at least one second control menu for controlling image photographing in the third region.

According to various embodiments, the method may further include identifying a user's gripping state of the electronic device, and determining a position of the first region in which the second preview image is displayed, based on the identified gripping state.

According to various embodiments, the electronic device may include a foldable electronic device or a rollable electronic device. The designated first event may include an event for folding the foldable electronic device, an event for rolling the flexible display of the rollable electronic device, or an event for selecting a designated menu included in the first preview image.

According to various embodiments, the displaying of the at least one captured image in the second region may include displaying the at least one captured image by reducing a size thereof by a specific ratio.

According to various embodiments, the first control menu included in the second region may include at least some of third control menus provided by a viewer application that manages a captured image displayed in the second region or at least one of new menus which are not provided by the viewer application.

According to various embodiments, the method may further include: executing an image playback application corresponding to a captured image displayed in the second region in response to a designated first input detected in the second region; and displaying the captured image displayed in the second region in a full screen on the display.

According to various embodiments, the method may further include displaying a previous image, displaying a next image, or playing a video, in the second region in response to a designated second input detected in the second region.

An electronic device (e.g., the electronic device 101, the first electronic device 201, the second electronic device 203, the third electronic device 205, and the fourth electronic device 207) according to various embodiments may include: a flexible display (e.g., the display module 160, the second display 262, and the displays 264, 266, 268); an image sensor (e.g., the camera module 180 and the first camera modules 281, 283, 285, and 287); at least one sensor (e.g., the sensor module 176) for detecting a state change of the flexible display; at least one processor (e.g., the processor 120); and a memory (e.g., the memory 130). The memory may store instructions that, when executed, cause the at least one processor to: display, in a first state in which a partial region of the flexible display is activated, a first preview image in the partial region of the flexible display in response to activation of the image sensor; identify, through the at least one sensor, a change to a second state in which a region for displaying a screen of the flexible display is increased; dividing the increased region of the flexible display into at least two regions in response to the change to the second state; displaying a second preview image in one region of the divided regions; and displaying at least one captured image in the other region of the divided regions. The other region may include at least control menu varying based on a property of the at least one captured image.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1$^{st}$" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a flexible display;
   an image sensor;
   memory storing one or more computer programs; and
   at least one processor communicatively coupled to the flexible display, the image sensor, and the memory,
   wherein the one or more computer programs include computer-executable instructions that, when executed by the at least one processor, cause the electronic device to:
   display a first preview image on the flexible display in response to activation of the image sensor,
   divide the flexible display into at least two regions in response to detecting a designated first event,
   display a second preview image with an indication of a shoot mode for image capture via the image sensor in a first region among the divided at least two regions, and
   display at least one captured image, which is captured via the image sensor using the shoot mode, with at least one first control menu corresponding to the shoot mode in a second region among the divided at least two regions, and
   wherein the at least one first control menu is a control menu not provided by a dedicated viewer application, and includes one of a plurality of different combinations of menu items depending on which one of a plurality of different shoot modes corresponds to the shoot mode.

2. The electronic device of claim 1, wherein the one or more computer programs further include computer-executable instructions that, when executed by the at least one processor, cause the electronic device to:
   change, in response to detecting a designated second event, a position of the first region for displaying the second preview image and a position of the second region for displaying the at least one captured image.

3. The electronic device of claim 1,
   wherein the dividing of the flexible display into the at least two regions comprises further dividing the flexible display such that the flexible display has a third region distinguished from the first region and the second region, and
   wherein the one or more computer programs further include computer-executable instructions that, when executed by the at least one processor, cause the electronic device to:

display, in the third region, at least one second control menu for controlling image capture through the image sensor.

4. The electronic device of claim 1, wherein the one or more computer programs further include computer-executable instructions that, when executed by the at least one processor, cause the electronic device to:
identify a user's gripping state with respect to the electronic device by using a touch sensor or a separate sensor included in the flexible display, and
determine a position of the first region in which the second preview image is displayed, based on the identified gripping state.

5. The electronic device of claim 1, wherein the electronic device comprises a foldable electronic device or a rollable electronic device.

6. The electronic device of claim 5, wherein the designated first event comprises:
an event for folding the foldable electronic device;
an event for rolling the flexible display of the rollable electronic device; or
an event for selecting a designated menu included in the first preview image.

7. The electronic device of claim 1, wherein the displaying of the at least one captured image in the second region comprises displaying the at least one captured image by reducing a size thereof by a specific ratio.

8. The electronic device of claim 1, wherein the first control menu included in the second region comprises at least some of third control menus provided by a viewer application that manages a captured image displayed in the second region or at least one of new menus which are not provided by the viewer application.

9. The electronic device of claim 1, wherein the one or more computer programs further include computer-executable instructions that, when executed by the at least one processor, cause the electronic device to:
execute an image playback application corresponding to a captured image displayed in the second region, in response to a designated first input detected in the second region; and
display the captured image displayed in the second region in a full screen on the flexible display.

10. The electronic device of claim 1, wherein the one or more computer programs further include computer-executable instructions that, when executed by the at least one processor, cause the electronic device to:
display a previous image;
display a next image; or
play a video, in the second region in response to a designated second input detected in the second region.

11. A method performed by an electronic device, the method comprising:
displaying a first preview image on a display of the electronic device in response to activation of an image sensor of the electronic device;
dividing the display into at least two regions in response to detecting a designated first event;
displaying a second preview image with an indication of a shoot mode for image capture via the image sensor in a first region of the divided at least two regions; and
displaying at least one captured image, which is captured via the image sensor using the shoot mode, with at least one first control menu corresponding to the shoot mode in a second region of the divided at least two regions,
wherein the at least one first control menu is a control menu not provided by a dedicated viewer application, and includes one of a plurality of different combinations of menu items depending on which one of a plurality of different shoot modes corresponds to the shoot mode.

12. The method of claim 11, further comprising changing, in response to detecting a designated second event, a position of the first region for displaying the second preview image and a position of the second region for displaying the at least one captured image.

13. The method of claim 11,
wherein the dividing of the display into the at least two regions further comprises dividing the display such that the display has a third region distinguished from and the first region and the second region, and
wherein the method further comprises displaying at least one second control menu for controlling image capture in the third region.

14. The method of claim 11, further comprising:
identifying a user's gripping state of the electronic device; and
determining a position of the first region in which the second preview image is displayed, based on the identified gripping state.

15. The method of claim 11,
wherein the electronic device comprises a foldable electronic device or a rollable electronic device and the display comprises a flexible display, and
wherein the designated first event comprises an event for folding the foldable electronic device, an event for rolling the flexible display of the rollable electronic device, or an event for selecting a designated menu included in the first preview image.

16. The method of claim 11, wherein the displaying of the at least one captured image in the second region comprises displaying the at least one captured image by reducing a size thereof by a specific ratio.

17. The method of claim 11, wherein the first control menu included in the second region comprises at least some of third control menus provided by a viewer application that manages a captured image displayed in the second region or at least one of new menus which are not provided by the viewer application.

18. The method of claim 11, further comprising:
executing an image playback application corresponding to a captured image displayed in the second region, in response to a designated first input detected in the second region; and
displaying the captured image displayed in the second region in a full screen on the display.

19. The method of claim 11, further comprising:
displaying a previous image;
displaying a next image; or
playing a video, in the second region in response to a designated second input detected in the second region.

20. An electronic device comprising:
a flexible display;
an image sensor;
at least one sensor configured to detect a state change of the flexible display;
memory storing one or more computer programs; and
at least one processor communicatively coupled to the flexible display, the image sensor, the at least one sensor, and the memory,
wherein the one or more computer programs include computer-executable instructions that, when executed by the at least one processor, cause the electronic device to:

display, in a first state in which a partial region of the flexible display is activated, a first preview image in the partial region of the flexible display in response to activation of the image sensor, identify, through the at least one sensor, a change to a second state in which a region for displaying a screen of the flexible display is increased, divide the increased region of the flexible display into at least two regions in response to the change to the second state, display a second preview image with an indication of a shoot mode for image capture via the image sensor in a first region among the divided at least two regions, and display at least one captured image, which is captured via the image sensor using the shoot mode, with at least one control menu corresponding to the shoot mode in a second region among the divided at least two regions, and wherein the at least one control menu is a control menu not provided by a dedicated viewer application, and includes one of a plurality of different combinations of menu items depending on which one of a plurality of different shoot modes corresponds to the shoot mode.

21. The electronic device of claim 20, wherein the one or more computer programs further include computer-executable instructions that, when executed by the at least one processor, cause the electronic device to:

determine that the image sensor has been deactivated, and terminate the at least one control menu in response to the determination.

22. The electronic device of claim 20, wherein the at least one captured image comprises a still image, and wherein the at least one control menu comprises at least one of an edit menu, a share menu, or a delete menu.

23. The electronic device of claim 20, wherein the at least one captured image comprises a video image, and wherein the at least one control menu comprises at least one of a share menu, a delete menu, a first playback menu using a preview function, and a second playback menu using a video playback application.

* * * * *